(12) United States Patent
Gonzalez et al.

(10) Patent No.: US 7,748,031 B2
(45) Date of Patent: *Jun. 29, 2010

(54) MASS STORAGE DEVICE WITH AUTOMATED CREDENTIALS LOADING

(75) Inventors: Carlos J. Gonzalez, Los Gatos, CA (US); Joerg Ferchau, Morgan Hill, CA (US); Fabrice Jogand-Coulomb, San Carlos, CA (US)

(73) Assignee: SanDisk Corporation, Milpitas, CA (US)

(*) Notice: Subject to any disclaimer, the term of this patent is extended or adjusted under 35 U.S.C. 154(b) by 1155 days.

This patent is subject to a terminal disclaimer.

(21) Appl. No.: 11/319,835

(22) Filed: Dec. 27, 2005

(65) Prior Publication Data

US 2007/0011724 A1 Jan. 11, 2007

Related U.S. Application Data

(60) Provisional application No. 60/697,906, filed on Jul. 8, 2005.

(51) Int. Cl.
*H04L 9/32* (2006.01)
*G06F 21/20* (2006.01)
*G06F 7/04* (2006.01)
*G06F 15/16* (2006.01)

(52) U.S. Cl. ............... 726/9; 726/20; 713/184; 713/185

(58) Field of Classification Search ............ None
See application file for complete search history.

(56) References Cited

U.S. PATENT DOCUMENTS 4,549,896 A 10/1985 Streicher et al. ............ 65/135

(Continued)

FOREIGN PATENT DOCUMENTS

CN 1466060 A1 1/2004

(Continued)

OTHER PUBLICATIONS

Identification Cards—Contactless Integrated Circuit(s) Cards—Proximity Cards—Part 1: Physical Characteristics, ISO_IEC_14443-1_2000_PDF, 10 pages, 2000.

(Continued)

*Primary Examiner*—Christopher A Revak
(74) *Attorney, Agent, or Firm*—Jenkins, Wilson, Taylor & Hunt, P.A.

(57) ABSTRACT

A portable mass storage device for use in two factor authentication systems and methods. A secure portable mass storage device protects content from being freely copied with security mechanisms and firmware. The security functionality also protects confidential user credentials and passwords, as well as algorithms and seeds needed for two factor authentication or asymmetric authentication methods. A client application residing in the mass storage device acts as both a password manager and an authentication manager that seamlessly performs the authentication procedures in the background while signing a user into various institutions of his choosing. A very high level of security is integrated into a mass storage device the user has for purposes other than two factor authentication, and the convenience of highly secure password management also comes in a convenient pocket sized package easy for the user to transport. This facilitates the acceptance of two factor authentication, and increases security for a wide variety of online transactions.

18 Claims, 16 Drawing Sheets

U.S. PATENT DOCUMENTS

| | | | |
|---|---|---|---|
| 4,590,552 A | 5/1986 | Guttag et al. | 364/200 |
| 4,697,072 A | 9/1987 | Kawana | |
| 4,713,753 A | 12/1987 | Boebert et al. | 364/200 |
| 4,780,905 A | 10/1988 | Cruts et al. | 380/44 |
| 4,797,853 A | 1/1989 | Savage et al. | 364/900 |
| 4,907,268 A | 3/1990 | Bosen et al. | 380/4 |
| 5,006,823 A | 4/1991 | Baril et al. | 333/164 |
| 5,052,040 A | 9/1991 | Preston et al. | |
| 5,065,429 A | 11/1991 | Lang | 380/25 |
| 5,129,074 A | 7/1992 | Kikuchi et al. | |
| 5,235,641 A | 8/1993 | Nozawa et al. | 380/21 |
| 5,237,609 A | 8/1993 | Kimura | |
| 5,268,870 A | 12/1993 | Harari | 365/218 |
| 5,293,424 A | 3/1994 | Holtey et al. | 380/23 |
| 5,311,595 A | 5/1994 | Bjerrum et al. | 380/25 |
| 5,319,765 A | 6/1994 | Kimura | 395/425 |
| 5,327,563 A | 7/1994 | Singh | 395/700 |
| 5,404,485 A | 4/1995 | Ban | 395/425 |
| 5,438,575 A | 8/1995 | Bertrand | 371/48 |
| 5,442,704 A | 8/1995 | Holtey et al. | 380/23 |
| 5,455,862 A | 10/1995 | Hoskinson | 380/21 |
| 5,473,692 A | 12/1995 | Davis | |
| 5,477,039 A | 12/1995 | Lisimaque et al. | 235/380 |
| 5,509,120 A | 4/1996 | Merkin et al. | |
| 5,530,862 A | 6/1996 | Wadsworth et al. | |
| 5,596,738 A | 1/1997 | Pope | |
| 5,604,801 A | 2/1997 | Dolan et al. | |
| 5,606,660 A | 2/1997 | Estakhri et al. | 395/183.14 |
| 5,629,513 A | 5/1997 | Geronimi et al. | 235/492 |
| 5,684,742 A | 11/1997 | Bublitz et al. | |
| 5,687,235 A | 11/1997 | Perlman et al. | |
| 5,710,639 A | 1/1998 | Kuznicki et al. | 358/426 |
| 5,742,616 A | 4/1998 | Torreiter et al. | |
| 5,825,880 A | 10/1998 | Sudia et al. | |
| 5,825,882 A | 10/1998 | Kowalski et al. | 380/25 |
| 5,841,871 A * | 11/1998 | Pinkas | 713/155 |
| 5,857,020 A | 1/1999 | Peterson, Jr. | 380/4 |
| 5,860,082 A | 1/1999 | Smith et al. | 711/103 |
| 5,886,926 A | 3/1999 | Marquot | |
| RE36,181 E | 4/1999 | Koopman, Jr. et al. | 380/23 |
| 5,896,398 A | 4/1999 | Sekine | |
| 5,903,651 A | 5/1999 | Kocher | |
| 5,917,909 A | 6/1999 | Lamla | 705/67 |
| 5,930,167 A | 7/1999 | Lee et al. | |
| 5,933,854 A | 8/1999 | Yoshimura | 711/164 |
| 5,937,425 A | 8/1999 | Ban | |
| 5,943,423 A | 8/1999 | Muftic | |
| 5,949,877 A | 9/1999 | Traw et al. | |
| 5,956,405 A | 9/1999 | Yuval | 380/29 |
| 5,987,134 A | 11/1999 | Shin et al. | |
| 5,995,623 A | 11/1999 | Kawano et al. | |
| 5,995,965 A | 11/1999 | Experton | |
| 6,026,402 A | 2/2000 | Vossen et al. | 707/9 |
| 6,028,933 A | 2/2000 | Heer et al. | 380/9 |
| 6,067,621 A * | 5/2000 | Yu et al. | 713/172 |
| 6,073,234 A | 6/2000 | Kigo et al. | |
| 6,094,724 A | 7/2000 | Benhammou et al. | |
| 6,101,588 A | 8/2000 | Farley | |
| 6,134,550 A | 10/2000 | Van Oorschot et al. | |
| 6,148,354 A | 11/2000 | Ban et al. | 710/102 |
| 6,154,544 A | 11/2000 | Farris et al. | 380/262 |
| 6,158,004 A | 12/2000 | Mason et al. | 713/200 |
| 6,181,252 B1 | 1/2001 | Nakano | 340/825.31 |
| 6,182,229 B1 | 1/2001 | Nielsen | |
| 6,189,097 B1 | 2/2001 | Tycksen, Jr. et al. | |
| 6,209,099 B1 | 3/2001 | Saunders | |
| 6,223,271 B1 | 4/2001 | Cepulis | |
| 6,230,223 B1 | 5/2001 | Olarig | 710/126 |
| 6,230,233 B1 | 5/2001 | Lofgren et al. | 711/103 |
| 6,236,280 B1 | 5/2001 | Allee | |
| 6,243,816 B1 | 6/2001 | Fang et al. | |
| 6,253,328 B1 | 6/2001 | Smith, Jr. | |
| 6,343,291 B1 | 1/2002 | Goldman | |
| 6,353,888 B1 | 3/2002 | Kakehi et al. | |
| 6,356,941 B1 | 3/2002 | Cohen | 709/219 |
| 6,370,251 B1 | 4/2002 | Hardy et al. | 380/286 |
| 6,371,377 B2 | 4/2002 | Asoh et al. | 235/487 |
| 6,385,729 B1 | 5/2002 | DiGiorgio et al. | |
| 6,389,542 B1 | 5/2002 | Flyntz | |
| 6,393,565 B1 | 5/2002 | Lockhart et al. | 713/172 |
| 6,422,460 B1 | 7/2002 | Boesch | |
| 6,434,700 B1 | 8/2002 | Alonso et al. | |
| 6,445,794 B1 | 9/2002 | Shefi | 380/46 |
| 6,456,528 B1 | 9/2002 | Chen | |
| 6,457,126 B1 | 9/2002 | Nakamura et al. | 713/166 |
| 6,481,632 B2 | 11/2002 | Wentker et al. | |
| 6,490,680 B1 | 12/2002 | Scheidt et al. | |
| 6,510,501 B1 | 1/2003 | Ho | |
| 6,513,116 B1 | 1/2003 | Tycksen, Jr. et al. | |
| 6,522,655 B1 | 2/2003 | Laiho | 370/410 |
| 6,571,335 B1 | 5/2003 | Thangadurai et al. | |
| 6,577,734 B1 | 6/2003 | Etzel et al. | 380/277 |
| 6,615,347 B1 | 9/2003 | De Silva et al. | |
| 6,615,352 B2 | 9/2003 | Terao et al. | |
| 6,629,192 B1 | 9/2003 | Schaefer et al. | 711/103 |
| 6,671,808 B1 | 12/2003 | Abbott et al. | |
| 6,678,741 B1 | 1/2004 | Nothcutt et al. | |
| 6,678,828 B1 | 1/2004 | Pham et al. | 713/201 |
| 6,694,436 B1 | 2/2004 | Audebert | |
| 6,714,921 B2 | 3/2004 | Stefik et al. | |
| 6,742,117 B1 | 5/2004 | Hikita et al. | 713/172 |
| 6,754,765 B1 | 6/2004 | Chang et al. | 711/103 |
| 6,763,399 B2 | 7/2004 | Margalit et al. | |
| 6,779,113 B1 | 8/2004 | Guthery | |
| 6,783,078 B1 | 8/2004 | Leaming | 235/492 |
| 6,788,575 B2 | 9/2004 | Kozakai et al. | |
| 6,804,786 B1 | 10/2004 | Chamley et al. | |
| 6,810,123 B2 | 10/2004 | Farris et al. | 380/262 |
| 6,816,900 B1 | 11/2004 | Vogel et al. | |
| 6,829,676 B2 | 12/2004 | Maeda et al. | 711/103 |
| 6,832,731 B2 | 12/2004 | Kaneko | 235/492 |
| 6,845,908 B2 | 1/2005 | Mority et al. | |
| 6,848,045 B2 | 1/2005 | Long et al. | |
| 6,865,555 B2 | 3/2005 | Novak | 705/59 |
| 6,880,079 B2 | 4/2005 | Kefford et al. | |
| 6,880,084 B1 | 4/2005 | Brittenham et al. | |
| 6,892,304 B1 | 5/2005 | Galsso et al. | |
| 6,901,499 B2 | 5/2005 | Aasheim et al. | |
| 6,912,633 B2 | 6/2005 | De Jong | |
| 6,928,547 B2 | 8/2005 | Brown et al. | |
| 6,938,162 B1 | 8/2005 | Nagai et al. | |
| 6,988,175 B2 | 1/2006 | Lasser | |
| 7,023,996 B2 | 4/2006 | Stephenson et al. | |
| 7,036,020 B2 | 4/2006 | Thibadeau | |
| 7,051,157 B2 | 5/2006 | James | |
| 7,058,818 B2 | 6/2006 | Dariel | 713/189 |
| 7,062,616 B2 | 6/2006 | Sadhasivan et al. | 711/153 |
| 7,073,063 B2 | 7/2006 | Peinado | |
| 7,073,073 B1 | 7/2006 | Nonaka et al. | |
| 7,095,585 B2 | 8/2006 | Payne et al. | |
| 7,120,729 B2 | 10/2006 | Gonzalez et al. | 711/103 |
| 7,124,301 B1 | 10/2006 | Uchida | |
| 7,127,550 B1 | 10/2006 | Lin | |
| 7,193,899 B2 | 3/2007 | Eggleston et al. | |
| 7,215,771 B2 | 5/2007 | Hamlin | |
| 7,225,341 B2 | 5/2007 | Yoshino et al. | |
| 7,246,266 B2 | 7/2007 | Sneed et al. | |
| 7,269,741 B2 | 9/2007 | Matsui et al. | |
| 7,299,358 B2 | 11/2007 | Chateau et al. | |
| 7,322,042 B2 | 1/2008 | Srinivasan et al. | |
| 7,364,087 B2 | 4/2008 | Zimmer et al. | |
| 7,370,192 B2 | 5/2008 | Sumner | |
| 7,380,275 B2 | 5/2008 | Srinivasan et al. | |
| 7,409,705 B2 * | 8/2008 | Ueda et al. | 726/5 |

| | | | | | |
|---|---|---|---|---|---|
| 7,412,053 B1 | 8/2008 | Lyle | 2004/0139021 A1 | 7/2004 | Reed et al. ............... 705/50 |
| 7,426,747 B2 | 9/2008 | Thibadeau | 2004/0148536 A1 | 7/2004 | Zimmer et al. |
| 7,478,248 B2 | 1/2009 | Ziv et al. | 2004/0153642 A1 | 8/2004 | Plotkin et al. ............ 713/150 |
| 7,493,656 B2 | 2/2009 | Goodwill et al. | 2004/0168081 A1 | 8/2004 | Ladas et al. |
| 7,506,128 B2 | 3/2009 | Deo et al. | 2004/0186994 A1 | 9/2004 | Herbert et al. ............ 713/164 |
| 7,519,989 B2* | 4/2009 | Lin et al. .................. 726/9 | 2004/0193925 A1 | 9/2004 | Safriel |
| 7,523,072 B2 | 4/2009 | Stefik et al. | 2004/0230963 A1 | 11/2004 | Rothman et al. |
| 7,594,135 B2 | 9/2009 | Gonzalez et al. | 2004/0247129 A1 | 12/2004 | Patariu et al. |
| 2001/0019614 A1 | 9/2001 | Madoukh ................. 380/277 | 2004/0264254 A1 | 12/2004 | Eggleston et al. |
| 2001/0025355 A1 | 9/2001 | Palm et al. ................ 714/726 | 2004/0268339 A1 | 12/2004 | Van Someren et al. |
| 2001/0037435 A1 | 11/2001 | Van Doren | 2005/0010758 A1 | 1/2005 | Landrock et al. |
| 2001/0047335 A1 | 11/2001 | Arndt et al. | 2005/0010783 A1 | 1/2005 | Libin et al. |
| 2002/0023219 A1 | 2/2002 | Treffers et al. | 2005/0015588 A1* | 1/2005 | Lin et al. ................. 713/159 |
| 2002/0029340 A1 | 3/2002 | Pensak et al. | 2005/0033968 A1 | 2/2005 | Dupouy et al. |
| 2002/0029343 A1 | 3/2002 | Kurita ...................... 713/185 | 2005/0049931 A1 | 3/2005 | Wisnudel et al. .......... 705/26 |
| 2002/0034303 A1 | 3/2002 | Farris et al. ............... 380/270 | 2005/0050330 A1 | 3/2005 | Agam et al. |
| 2002/0065730 A1 | 5/2002 | Nii ............................ 705/26 | 2005/0091496 A1 | 4/2005 | Hyser |
| 2002/0099666 A1 | 7/2002 | Dryer et al. ............... 705/71 | 2005/0108564 A1 | 5/2005 | Freeman et al. |
| 2002/0141588 A1 | 10/2002 | Rollins ..................... 380/277 | 2005/0109841 A1 | 5/2005 | Ryan et al. |
| 2002/0145632 A1 | 10/2002 | Shmueli et al. ............ 345/835 | 2005/0114620 A1 | 5/2005 | Justen ...................... 711/170 |
| 2002/0166023 A1 | 11/2002 | Nolan et al. | 2005/0120205 A1 | 6/2005 | Umezawa et al. |
| 2002/0174337 A1 | 11/2002 | Aihara ..................... 713/172 | 2005/0123132 A1 | 6/2005 | Sumner |
| 2002/0176575 A1 | 11/2002 | Qawami et al. ............ 380/201 | 2005/0132186 A1 | 6/2005 | Khan et al. |
| 2002/0178370 A1 | 11/2002 | Gurevich et al. | 2005/0137997 A1 | 6/2005 | Bussert et al. |
| 2002/0186842 A1 | 12/2002 | Sabet-Sharghi et al. ..... 380/200 | 2005/0138393 A1 | 6/2005 | Challener et al. |
| 2002/0191794 A1 | 12/2002 | Farris et al. ............... 380/260 | 2005/0160217 A1 | 7/2005 | Gonzalez et al. ............. 711/6 |
| 2002/0199001 A1 | 12/2002 | Wenocur et al. | 2005/0180209 A1 | 8/2005 | Lasser |
| 2003/0018889 A1 | 1/2003 | Burnett et al. ............. 713/153 | 2005/0185493 A1 | 8/2005 | Fujioka et al. |
| 2003/0028514 A1 | 2/2003 | Lord et al. | 2005/0190599 A1 | 9/2005 | Eggleston et al. |
| 2003/0028797 A1 | 2/2003 | Long et al. | 2005/0193025 A1 | 9/2005 | Mosek |
| 2003/0061504 A1 | 3/2003 | Sprigg et al. .............. 713/200 | 2005/0193161 A1 | 9/2005 | Lee et al. |
| 2003/0065876 A1 | 4/2003 | Lasser | 2005/0193206 A1 | 9/2005 | Kunisa et al. |
| 2003/0070083 A1 | 4/2003 | Nessler .................... 713/193 | 2005/0209716 A1 | 9/2005 | Burh et al. |
| 2003/0101327 A1 | 5/2003 | Beck | 2005/0256838 A1 | 11/2005 | Lasser |
| 2003/0110169 A1 | 6/2003 | Zuili et al. ................. 707/9 | 2006/0036873 A1 | 2/2006 | Ho et al. |
| 2003/0120938 A1 | 6/2003 | Mullor ..................... 713/190 | 2006/0083228 A1* | 4/2006 | Ong et al. ................. 370/389 |
| 2003/0131210 A1 | 7/2003 | Mueller .................... 711/200 | 2006/0106606 A1* | 5/2006 | Labaton ................... 704/250 |
| 2003/0135739 A1 | 7/2003 | Talton | 2006/0107047 A1 | 5/2006 | Bar-El |
| 2003/0149854 A1 | 8/2003 | Yoshino et al. | 2006/0107063 A1* | 5/2006 | Fiske ....................... 713/184 |
| 2003/0149886 A1 | 8/2003 | Ito et al. ................... 713/193 | 2006/0107064 A1* | 5/2006 | Fiske ....................... 713/184 |
| 2003/0156473 A1 | 8/2003 | Sinclair et al. ............. 365/200 | 2006/0107312 A1* | 5/2006 | Fiske ........................... 726/5 |
| 2003/0172280 A1 | 9/2003 | Scheidt et al. | 2006/0107316 A1* | 5/2006 | Fiske ......................... 726/18 |
| 2003/0177319 A1 | 9/2003 | De Jong | 2006/0112241 A1 | 5/2006 | Weiss et al. |
| 2003/0188117 A1 | 10/2003 | Yoshino et al. | 2006/0126422 A1 | 6/2006 | Takagi et al. |
| 2003/0196028 A1 | 10/2003 | Maeda et al. | 2006/0129844 A1 | 6/2006 | Oshikiri |
| 2003/0204726 A1 | 10/2003 | Kefford et al. | 2006/0143600 A1 | 6/2006 | Cottrell et al. |
| 2003/0212894 A1 | 11/2003 | Buck et al. | 2006/0161725 A1 | 7/2006 | Lee et al. |
| 2003/0212895 A1 | 11/2003 | Kisliakov | 2006/0176068 A1 | 8/2006 | Holtzman et al. |
| 2003/0217011 A1 | 11/2003 | Peinado et al. | 2006/0177064 A1 | 8/2006 | Holtzman et al. |
| 2003/0221117 A1 | 11/2003 | Teglia | 2006/0232826 A1 | 10/2006 | Bar-El |
| 2004/0024917 A1 | 2/2004 | Kennedy et al. | 2006/0239449 A1 | 10/2006 | Holtzman et al. |
| 2004/0025010 A1 | 2/2004 | Azema et al. | 2006/0242064 A1 | 10/2006 | Jogand-Coulomb et al. |
| 2004/0025011 A1 | 2/2004 | Azema et al. | 2006/0242065 A1 | 10/2006 | Jogand-Coulomb et al. |
| 2004/0025027 A1 | 2/2004 | Balard et al. | 2006/0242066 A1 | 10/2006 | Jogand-Coulomb et al. |
| 2004/0025035 A1 | 2/2004 | Jean-Claude et al. | 2006/0242067 A1 | 10/2006 | Jogand-Coulomb et al. |
| 2004/0025036 A1 | 2/2004 | Balard et al. | 2006/0242068 A1 | 10/2006 | Jogand-Coulomb et al. |
| 2004/0026496 A1 | 2/2004 | Zuili | 2006/0242150 A1 | 10/2006 | Jogand-Coulomb et al. |
| 2004/0039911 A1 | 2/2004 | Oka et al. | 2006/0242151 A1 | 10/2006 | Jogand-Coulomb et al. |
| 2004/0044625 A1 | 3/2004 | Sakamura et al. ............ 705/41 | 2006/0262928 A1 | 11/2006 | Bar-El et al. |
| 2004/0054907 A1 | 3/2004 | Chateau et al. | 2007/0016941 A1 | 1/2007 | Gonzalez et al. |
| 2004/0059916 A1 | 3/2004 | Mizushima et al. | 2007/0061502 A1 | 3/2007 | Lasser et al. |
| 2004/0063495 A1 | 4/2004 | LeMay et al. | 2007/0061570 A1 | 3/2007 | Holtzman et al. |
| 2004/0066936 A1 | 4/2004 | Farris et al. ............... 380/270 | 2007/0061581 A1 | 3/2007 | Holtzman et al. |
| 2004/0068631 A1 | 4/2004 | Ukeda et al. | 2007/0061597 A1 | 3/2007 | Holtzman et al. |
| 2004/0083335 A1 | 4/2004 | Gonzalez et al. ............ 711/103 | 2007/0061897 A1 | 3/2007 | Holtzman et al. |
| 2004/0083370 A1 | 4/2004 | de Jong .................... 713/182 | 2007/0067828 A1* | 3/2007 | Bychkov ...................... 726/3 |
| 2004/0093592 A1 | 5/2004 | Rao | 2007/0113294 A1* | 5/2007 | Field et al. .................. 726/27 |
| 2004/0098585 A1 | 5/2004 | Grove et al. | 2007/0130472 A1* | 6/2007 | Buer et al. ................. 713/182 |
| 2004/0103288 A1 | 5/2004 | Ziv et al. .................. 713/185 | 2007/0143555 A1 | 6/2007 | Nemiroff et al. |
| 2004/0117653 A1 | 6/2004 | Shapira et al. ............. 713/201 | 2007/0168292 A1 | 7/2007 | Jogand-Coulomb et al. |
| 2004/0123127 A1 | 6/2004 | Teicher et al. | 2007/0180210 A1 | 8/2007 | Thibadeau |
| 2004/0128523 A1 | 7/2004 | Fujioka | 2007/0188183 A1 | 8/2007 | Holtzman et al. |
| 2004/0132437 A1 | 7/2004 | Ohmori et al. ............ 455/414.1 | 2007/0234064 A1* | 10/2007 | Nihei ....................... 713/183 |

| | | | |
|---|---|---|---|
| 2007/0250920 A1* | 10/2007 | Lindsay | 726/7 |
| 2008/0010449 A1 | 1/2008 | Holtzman et al. | |
| 2008/0010450 A1 | 1/2008 | Holtzman et al. | |
| 2008/0010451 A1 | 1/2008 | Holtzman et al. | |
| 2008/0010455 A1 | 1/2008 | Holtzman et al. | |
| 2008/0010458 A1 | 1/2008 | Holtzman et al. | |
| 2008/0010685 A1 | 1/2008 | Holtzman et al. | |
| 2008/0022395 A1 | 1/2008 | Holtzman et al. | |
| 2008/0022413 A1 | 1/2008 | Holtzman et al. | |
| 2008/0034440 A1 | 2/2008 | Holtzman et al. | |
| 2008/0072060 A1 | 3/2008 | Cannon et al. | |
| 2008/0077799 A1* | 3/2008 | Labaton | 713/184 |
| 2008/0082447 A1* | 4/2008 | Jogand-Coulomb et al. | 705/53 |
| 2008/0215847 A1 | 9/2008 | Holtzman et al. | |
| 2008/0276098 A1* | 11/2008 | Florencio et al. | 713/183 |
| 2008/0313719 A1* | 12/2008 | Kaliski et al. | 726/5 |
| 2009/0055655 A1 | 2/2009 | Ziv et al. | |
| 2009/0119501 A1 | 5/2009 | Petersen | |
| 2009/0119517 A1 | 5/2009 | Ziv et al. | |
| 2009/0125997 A1* | 5/2009 | Cook | 726/6 |
| 2009/0205036 A1* | 8/2009 | Slaton et al. | 726/9 |
| 2009/0249076 A1* | 10/2009 | Reed et al. | 713/181 |
| 2009/0259588 A1* | 10/2009 | Lindsay | 705/40 |

FOREIGN PATENT DOCUMENTS

| | | |
|---|---|---|
| EP | 87143 A1 | 2/1983 |
| EP | 0 330 404 A2 | 8/1989 |
| EP | 461983 A1 | 6/1991 |
| EP | 461983 B1 | 4/1995 |
| EP | 0 919 904 A2 | 8/1998 |
| EP | 0 919 904 A3 | 6/1999 |
| EP | 1 004 992 A3 | 5/2000 |
| EP | 1 074 906 A1 | 8/2000 |
| EP | 1 209 657 A1 | 8/2000 |
| EP | 1 117 206 A2 | 7/2001 |
| EP | 1 273 996 A2 | 1/2003 |
| EP | 1 351 151 A2 | 10/2003 |
| EP | 1 361 527 A1 | 11/2003 |
| EP | 1 467 312 A1 | 4/2004 |
| EP | 0 849 657 A1 | 6/2004 |
| EP | 1 429 224 A1 | 6/2004 |
| EP | 1 487 170 A2 | 6/2004 |
| EP | 1 457 922 A3 | 9/2004 |
| EP | 1 467 312 A1 | 10/2004 |
| EP | 1487170 A2 | 12/2004 |
| EP | 1487170 A3 | 12/2004 |
| EP | 1 496 419 A1 | 1/2005 |
| EP | 1 594 250 A1 | 11/2005 |
| EP | 1933252 * | 6/2008 |
| GB | 2 391 082 A | 7/2002 |
| GB | 2 391 082 A | 1/2004 |
| JP | 2002-288453 A | 4/2002 |
| JP | 2002288453 | 10/2002 |
| KR | 2004-0063071 A | 7/2004 |
| WO | WO 98/07255 | 2/1998 |
| WO | WO 9947989 A1 | 9/1999 |
| WO | WO 99/64996 | 12/1999 |
| WO | WO 00/42491 | 7/2000 |
| WO | WO 00/48063 | 8/2000 |
| WO | WO 02/01368 A2 | 1/2002 |
| WO | WO 02/25415 | 3/2002 |
| WO | WO 02/42912 A1 | 5/2002 |
| WO | WO 0248846 A2 | 6/2002 |
| WO | WO 0248846 A3 | 6/2002 |
| WO | WO 02/063847 A2 | 8/2002 |
| WO | WO 02/096016 A2 | 11/2002 |
| WO | WO 02/103495 A1 | 12/2002 |
| WO | WO 03/081544 A2 | 10/2003 |
| WO | WO 03/096287 | 11/2003 |
| WO | WO 03/096287 A1 | 11/2003 |
| WO | WO 2004/034202 A2 | 4/2004 |
| WO | WO 2004/040578 A2 | 5/2004 |
| WO | WO 2004/040586 A1 | 5/2004 |
| WO | WO 2004/086228 A1 | 10/2004 |
| WO | WO 2004/092886 A2 | 10/2004 |
| WO | WO 2004/112036 A1 | 12/2004 |
| WO | WO 2005001653 A2 | 1/2005 |
| WO | WO 2005/013125 A1 | 2/2005 |
| WO | WO 2005010686 A2 | 2/2005 |
| WO | WO 2005010688 A2 | 2/2005 |
| WO | WO 2006/069194 A2 | 6/2006 |
| WO | WO 2006/069274 A2 | 6/2006 |
| WO | WO 2006/069311 A2 | 6/2006 |
| WO | WO 2006/069312 A2 | 6/2006 |
| WO | WO 2006/086232 A2 | 8/2006 |
| WO | WO 2007/008540 A2 | 1/2007 |
| WO | WO 2007/033321 A2 | 3/2007 |
| WO | WO 2007/033322 A2 | 3/2007 |
| WO | WO 2008/008243 A2 | 1/2008 |
| WO | WO 2008/008244 A2 | 1/2008 |
| WO | WO 2008/008245 A2 | 1/2008 |
| WO | WO 2008/013655 A2 | 1/2008 |
| WO | WO 2008/013656 A2 | 1/2008 |

OTHER PUBLICATIONS

Identification Cards—Contactless Integrated Circuit(s) Cards—Proximity Cards—Part 2: Radio Frequency Power and Signal Interface, ISO_IEC_14443-2_2001_PDF, 18 pages, 2001.
ISA/EPO, "Invitation to Pay Additional Fees," mailed on Mar. 8, 2007 in corresponding Int'l. App. No. PCT/US2006/003876, 7 pages.
ISA/EPO, "Notification of Transmittal of the International Search Report and the Written Opinion of the International Searching Authority, or the Declaration," mailed on Aug. 17, 2007 in corresponding Int'l. App. No. PCT/US2006/003876, 19 pages.
iKey 2032, Personal USB Authentication and Encryption Token, SafeNet, 2005, 2 pages.
iKey 1000, Workstation Security and Secure Remote Access, SafeNet, 2004, 2 pages.
Gemplus, Employee Smart Badge, One Integrated and Secure Smart Badge To Manage All Access, 2 pages.
Renesas, X-Mobile Card, Digital Rights Management, Authentication and Secure Storage for Mobile Devices, Providing Remote Access and Secure Storage Solutions for IT, Advanced Solutions Group, 2005, 4 pages.
RSA Security, Federated Identity Management and Return on Investment, White Paper, 2004-2005, 12 pages.
RSA Security, Federated Identity Manager, A Technical Overview, Technology Backgrounder, 2005, 16 pages.
Secure Business-to-Business Single Sign-On (B2B SSO) Based on Federated Identity Management, RSA Security, 2004-2005, 6 pages.
SafeNet AXIS, Strong Authentication and Single Sign-On, AXIS Instant Logical & Physical Access Security, 2005, 2 pages.
VeriSign, Trusted Federated Identity Solution Architecture, 2004, 16 pages.
VeriSign, Extending Managed PKI Services to Smart Cards for Greater Convenience and Security, 2001, 14 pages.
U.S. Appl. No. 11/319,835, "Mass Storage Device with Automated Credentials Loading", filed Dec. 27, 2005, Gonzalez et al.
U.S. Appl. No. 11/285,600, "Hardware Driver Integrity Check of Memory Card Controller Firmware", filed Nov. 21, 2005, Holtzman et al.
U.S. Appl. No. 11/317,390, "Methods Used in a Secure Memory Card With Life Cycle Phases", filed Dec. 22, 2005, Holtzman et al.
U.S. Appl. No. 11/317,862, "Secure Memory Card with Life Cycle Phases", filed Dec. 22, 2005, Holtzman et al.
U.S. Appl. No. 11/317,341, "Methods Used in a Secure Yet Flexible System Architecture for Secure Devices With Flash Mass Storage Memory", filed Dec. 22, 2005, Holtzman et al.
U.S. Appl. No. 11/317,339, "Secure Yet Flexible System Architecture for Secure Devices With Flash Mass Storage Memory", filed Dec. 22, 2005, Holtzman et al.
U.S. Appl. No. 11/313,536, "Control Structure for Versatile Content Control", filed Dec. 20, 2005, Fabrice Jogand-Coulomb et al.

U.S. Appl. No. 11/284,623, "Method of Hardware Driver Integrity Check of Memory Card Controller Firmware", filed Nov. 21, 2005, Michael Holtzman et al.

U.S. Appl. No. 11/053,273, "Secure Memory Card With Life Cycle Phases", filed Feb. 7, 2005, Holtzman et al.

Yang et al., CD-Rom Versus Web-Access to External Databases-Experiences and Insights, Rider University Libraries, pp. 193-200.

Rubin, Independent One-Time Passwords, USENIX Association, Proceedings of the Fifth USENIX UNIX Security Symposium, Jun. 5-7, 1995, 13 pages.

Rubin, Independent One-Time Passwords, USENIX, A Quarterly dedicated to the analysis and understanding of advanced computing systems, vol. 9, No. 1, Winter 1996, 15 pages.

Seitz et al., Key Management for Encrypted Data Storage in Distributed Systems, Proceedings of the Second IEEE International Security in Storage Workshop (SISW'03), 11 pages, 2003.

Lee et al., Modified Token-Update Scheme for Site Authentication, School of Computer Science and Engineering, Inha University, Incheon, 402-751, Korea, 6 pages.

Hoornaert, Vasco Data Security Enables Secure Communications Over the Internet, IS Audit & Control Journal, vol IV, 1999, 3 pages.

Open Specifications Integrate One-Time Passwords with Enterprise Applications, RSA Security, Feb. 2005, 10 pages.

RSA Specification, Cryptographic Token Key Initialization Protocol, V1.0 Draft 3, RSA Security, Jun. 14, 2005, 29 pages.

U.S. Appl. No. 60/717,163, "Secure Yet Flexible System Architecture for Secure Devices with Flash Mass Storage Memory," filed Sep. 14, 2005, Micky Holtzman.

U.S. Appl. No. 60/717,164, "Secure Yet Flexible System Architecture for Secure Devices with Flash Mass Storage Memory," filed Sep. 14, 2005, Holtzman, et al.

U.S. Appl. No. 60/717,347, "Hardware Driver Integrity Check of Memory Card Controller Firmware," filed Sep. 14, 2005, Holtzman, et al.

Akagi, A., "SD Format Verification," Matsushita Technical Journal Apr. 2002 vol. 49, No. 2 pp. 11-14 ISSN: 1343-9529.

Allard, J.J., "Dynamic Memory Array Card Burn In and High Speed Functional Card Testing," 1981 International Test Conference, Testing in the 1980's pp. 244-248.

Barsness, A.R. et al.,"ECC Memory Card with Built In Diagnostic Aids and Multiple Usage," IBM Technical Disclosure Bulletin, Apr. 1982 vol. 24, No. 11B pp. 6173-6174.

Black, John, "Comments to NIST concerning AES Modes of Operations: A Suggestion for Handling Arbitrary-Length Messages with the CBC MAC," University of Nevada, Reno, Phillip Rogaway, University of California at Davis http://csrc.nist.gov/CryptoToolkit/modes/proposedmodes/xcbc-mac/xcbc-mac-spec.pdf, 3 pages.

Deepakumara, Janaka, et al., "Performance Comparison of Message Authentication Code (MAC) Algorithms for the Internet Protocol Security (IPSEC) Electrical and Computer Engineering," Memorial University of Newfoundland, St. John's, NL, Canada, A1B3S7 http://www.engr.mun.ca/~howard/PAPERS/necec_2003b.pdf, 7 pages, 2003.

Dialog Search, Oct. 6, 2004 (15 pages).

Dialog Search, Oct. 3, 2005 (31 pages).

Discretix Technologies Ltd. "Secure Flash™ System Specification", Version 1.05, Jul. 15, 2004, Netanya, Israel (36 pages).

Engelbrecht, R., et al., ByMedCard-An Electronic Patient Record with Chip Card Functionality, Health Cards '97 Fourth International Congress pp. 313-317, 1997.

Frankel, Sheila, "RFC 3566—The AES-XCBC-MAC-96 Algorithm and Its Use With IPsec," NIST-National Institute of Standards and Technology, 820 West Diamond Ave., Room 677, Gaithersburg, MD 20899, http://www.faqs.org/rfcs/rfc3566.html, 10 pages.

Guibert, H.; Gamache, A., Optical Memory Card Applicability for Implementing a Portable Medical Record, Medical Informatics Jul.-Sep. 1993 vol. 18, No. 3 pp. 271-278 ISSN: 0307-7640.

ISA/EPO, "Invitation to Pay Additional Fees", mailed on Jan. 26, 2007 in corresponding Int'l. App. No. PCT/US2006/035839, 2 pages.

ISA/EPO, "Invitation to Pay Additional Fees", mailed on Dec. 18, 2006 in corresponding Int'l. App. No. PCT/US2006/026241, 7 pages.

ISA/EPO, "Notification of Transmittal of the International Search Report and the Written Opinion of the International Searching Authority, or the Declaration," mailed on Feb. 8, 2007 in corresponding Int'l. App. No. PCT/US2006/026241, 9 pages.

ISA/EPO, "Notification of Transmittal of the International Search Report and the Written Opinion of the International Searching Authority, or the Declaration," mailed on Mar. 29, 2007 in corresponding Int'l. App. No. PCT/US2006/035840, 6 pages.

ISA/EPO, "Notification of Transmittal of the International Search Report and the Written Opinion of the International Searching Authority, or the Declaration," mailed on May 25, 2007 in corresponding Int'l. App. No. PCT/US2006/035839, 9 pages.

ISA/EPO, "Written Opinion of the International Searching Authority," mailed on Feb. 8, 2007 in corresponding Int'l. App. No. PCT/US2006/026241, 15 pages.

ISA/EPO, "Written Opinion of the International Searching Authority," mailed on Mar. 29, 2007 in corresponding Int'l. App. No. PCT/US2006/035840, 8 pages.

ISA/EPO, "Written Opinion of the International Searching Authority," mailed on Sep. 13, 2006 in corresponding Int'l. App. No. PCT/US2006/035839, 12 pages.

Johnson, D., "Bus Emulation Drives Production Testing," Test & Measurement World Feb. 1995 vol. 15, No. 2 pp. 41-42, 44, 46, 48 ISSN: 0744-1657.

Nystrom RSA Security M: "The Protected One-Time Password Protocol (EAP-POTP)," IETF Standard-Working-Draft, Internet Engineering Task Force, IETF, CH No. 2, Jun. 30, 2005, XP015040287.

O.J. Horak, "Means and Measures for Data Security," Armed Forces Data Processing Agency, Stifgasse 2a, A-1070 Wien, Austria, IFAC SAFECOMP '89, Vienna, Austria, 1989, 9 pages.

Orlowski, Andrew, "Everything You Ever Wanted to Know About CPRM, But ZDNet Wouldn't Tell You . . . ," The Register.co.UK, Jan. 10, 2001, 6 pages.

Pinkas, Benny, "Efficient State Updates for Key Management," STAR Lab, Intertrust Technologies, Princeton, NJ, DRM 2001, LNCS 2320 pp. 40-56, 2002.

RSA Security Inc.: "A CryptoAPI Profile for One-Time Password Tokens V1.0 Draft 2" One-Time Password Specifications (OTPS), Jun. 27, 2005, XP002416270.

RSA Security Inc.: "OTP-WSS-Token: Web Services Security One-Time-Password (OTP) Token Profile, Version 1-0d3", One-Time Password Specifications (OTPS), Jul. 6, 2005, XP002416269.

RSA Security Inc.: "PKCS#11 Mechanisms for One-Time Password Tokens V1.0 5th Draft", One-Time Password Specifications, Jun. 27, 2005, XP002415773.

SanDisk Corporation "BE2 Architecture", Revision 1.1, Jun. 9, 2003 (21 pages).

SanDisk Corporation I, "CryptoFlash Integration in BE2", Revision 1.21, Oct. 19, 2004, (34 pages).

SanDisk Israel Discloser #SDK0570 "Flash Memory Card with In Stream data Encryption/Decryption", (4 pages).

ST Microelectronics: "Trusted Platform Module (TPM)"; May 2004; XP-002345888; 5 pages.

Tsuchida, S., "Test and Repair of Non-Volatile Commodity and Embedded Memories," Proceedings International Test Conference 2002 (Cat. No. 02CH37382) p. 1223 ISBN: 0 7803 7542 4.

Weippl, Edgar, "An Approach to Role-Based Access Control for Digital Content," Software Competence Center Hagenberg Hauptstr. 99 A4232 Hagenberg, Austria, 2001, 5 pages.

Wu, D.M., Doney, R., "A Universal Self-Test Design for Chip, Card and System," Proceedings 1992 IEEE International Workshop on Defect and Fault Tolerance in VLSI Systems (Cat. No. 92TH0481-2) pp. 305-314 ISBN: 0 8186 2837 5.

Communication pursuant to Article 94(3) EPC Ccorresponding to European Patent Application No. 06 786 405.2 (Jul. 30, 2008).

Communication Relating to the Results of the Partial International Search for International Application No. PCT/US2006/026241 mailed Dec. 18, 2006, 3 pages.

Haller et al., "A One-Time Password System," IETF Standard-Working-Draft, Internet Engineering Task Force, IETF, No. 1, Mar. 24, 1997, XP015024796, pp. 1-8.

Official Action for Chinese Application No. 200680032990.0 (Jul. 30, 2009).

Final Official Action for U.S. Appl. No. 11/317,862 (Jul. 6, 2009).
Office Action for U.S. Appl. No. 11/314,411 (Jun. 23, 2009).
Official Action for U.S. Appl. No. 11/317,341 (Jun. 18, 2009).
Final Official Action for U.S. Appl. No. 11/313,538 (Jun. 8, 2009).
Restriction Requirement for U.S. Appl. No. 11/053,273 (Jun. 8, 2009).
Office Action for U.S. Appl. No. 11/314,410 (May 13, 2009).
Office Action for U.S. Appl. No. 11/314,052 (May 12, 2009).
Official Action for U.S. Appl. No. 11/319,259 (May 12, 2009).
Official Action for U.S. Appl. No. 11/317,390 (Apr. 30, 2009).
Notice of Abandonment for U.S. Appl. No. 11/314,053 (Apr. 8, 2009).
Official Action for U.S. Appl. No. 11/285,600 (Mar. 24, 2009).
Office Action for U.S. Appl. No. 11/557,056 (Mar. 16, 2009).
Notice of Abandonment for U.S. Appl. No. 11/317,339 (Feb. 10, 2009).
Notice of Allowance and Fee(s) Due for U.S. Appl. No. 11/284,623 (Jan. 15, 2009).
Notice of Abandonment for U.S. Appl. No. 11/313,536 (Jan. 2, 2009).
Final Official Action for U.S. Appl. No. 11/317,341 (Nov. 28, 2008).
Official Action for U.S. Appl. No. 11/313,538 (Nov. 20, 2008).
Official Action for U.S. Appl. No. 11/317,862 (Nov. 19, 2008).
Official Action for U.S. Appl. No. 11/053,273 (Nov. 19, 2008).
Notice of Abandonment for U.S. Appl. No. 11/314,055 (Nov. 10, 2008).
Supplemental Notice of Allowability and Interview Summary for U.S. Appl. No. 11/284,623 (Oct. 31, 2008).
Notice of Abandonment for U.S. Appl. No. 11/313,870 (Oct. 14, 2008).
Notice of Allowance and Fee(s) Due for U.S. Appl. No. 11/284,623 (Sep. 23, 2008).
Official Action for U.S. Appl. No. 11/317,339 (Aug. 1, 2008).
Restriction Requirement for U.S. Appl. No. 11/314,053 (Jul. 1, 2008).
Official Action for U.S. Appl. No. 11/284,623 (Apr. 30, 2008).
International Search Report and Written Opinion for PCT/US2007/015431, 14 pages, (Apr. 16, 2008).
Final Official Action for U.S. Appl. No. 11/313,536 (Apr. 14, 2008).
Final Official Action for U.S. Appl. No. 11/313,538 (Apr. 9, 2008).
Final Official Action for U.S. Appl. No. 11/314,055 (Apr. 1, 2008).
Final Official Action for U.S. Appl. No. 11/313,870 (Apr. 1, 2008).
International Search Report and Written Opinion for PCT/US2007/015304, (Mar. 25, 2008).
Official Action for U.S. Appl. No. 11/317,341 (Feb. 21, 2008).
Official Action for U.S. Appl. No. 11/314,053 (Feb. 7, 2008).
International Search Report and Written Opinion for PCT/US2007/015432 (Jan. 17, 2008).
International Search Report and Written Opinion form PCT Application Serial No. PCT/US2007/015430 (Jan. 17, 2008).
International Search Report and Written Opinion for PCT/US2007/015301 (Jan. 10, 2008).
Restriction Requirement for U.S. Appl. No. 11/317,339 (Dec. 14, 2007).
Office Action for U.S. Appl. No. 11/314,053 (Nov. 9, 2007).
Office Action for U.S. Appl. No. 11/314,055 (Oct. 29, 2007).
Office Action for U.S. Appl. No. 11/313,870 (Oct. 29, 2007).
Office Action for U.S. Appl. No. 11/313,538 (Oct. 29, 2007).
Official Action for U.S. Appl. No. 11/313,536 (Oct. 17, 2007).
Invitation to Pay Additional Fees in corresponding Int'l. App. No. PCT/US2006/03589, (Jan. 26, 2007).
Notification of Transmittal of the International Search Report and the Written Opinion of the International Searching Authority, or the Declaration for International Application No. PCT/US2005/046478, (Sep. 25, 2006).
Dialog OneSearch, 55 pages, http://www.dialog.com/dwpi/ (Sep. 15, 2006).
Dialog OneSearch, 56 pages, http://www.dialog.com/dwpi/ (Sep. 12, 2006).
Notification of Transmittal of the International Search Report and the Written Opinion of the International Searching Authority, or the Declaration for Interntational Application No. PCT/US2005/046689, (Sep. 6, 2006).

Invitation to Pay Additional Fees for International Application No. PCT/US2005/046478, (Jul. 11, 2006).
Invitation to Pay Additional Fees, for Interntational Application No. PCT/US2005/046689, (Jul. 11, 2006).
Dialog OneSearch, 5 pages, http://www.dialog.com/dwpi/ (Jun. 26, 2006).
Notification of Transmittal of the International Search Report and the Written Opinion of the International Searching Authority, or the Declaration for Interntational Application No. PCT/US2005/046793, (Jun. 7, 2006).
Notification of Transmittal of the International Search Report and the Written Opinion of the International Searching Authority, or the Declaration for Interntational Application No. PCT/US2005/046795, (Jun. 7, 2006).
Dialog OneSearch, 50 pages, http://www.dialog.com/dwpi/ (Jun. 2006).
U.S. Appl. No. 11/284,623, for "Method for Hardware Driver Integrity Check of Memory Card Controller Firmware", filed Nov. 21, 2005.
International Telecommunication Union, "Series X: Data Networks, Open System Communications and Security (Information Technology-Open Systems Itnerconnection-The Directory: Public-Key and Attribute Certificate Frameworks)," ITU-T, X.509, pp. 1-170, (Aug. 2005).
Oasis, "Web Services Security X.509 Certificate Token Profile," Oasis Standard 500401, 16 pages, (Mar. 15, 2004).
Oritz, "An Introduction to Java Card Technology—Part 1," 17 pages. http://developers.sun.com/techtopics/mobility/javacard/articles/javacard1/, (May 29, 2003).
Van Moffaert et al., "Digital Rights Management: DRM is a Key Enabler for the Future Growth of the Broadband Access Market, and the Telecom/Networking Marking in General," Alcatel Telecommunications Review, Alcatel, Paris Cedex, FR, 8 pages (Apr. 2003).
Lloyd et al., "Understanding Certification Path Construction," PKI Forum, pp. 1-14, (Sep. 2002).
Federal Information Processing Standards Publications 180-2, "Secure Hash Standard", pp. 1-75, http://csrc.nist.gov/publications/fips/fips180-2/fips180-2.pdf, (Aug. 1, 2002).
Buhse, "Implications of Digital Rights Management for Online Music—A Business Perspective," T. Sander (Ed.), Security and Privacy in Digital Rights Management, ACM CCS-8 Workshop DRM, LNCS 2320, pp. 201-212, (2001).
Housley et al., "Internet X.509 Public Key Infrastructure Certificate and CRL Profile," Network Working Group, RFC 2459, The Internet Society, 137 pages, (Jan. 1999).
Kikuchi et al., "Performance Evaluation of Public-Key Certificate Revocation System with Balanced Hash Tree," Parallel Processing, 1999 International Workshop on Aizu-Wakamatsu, pp. 204-209, (1999).
Sandhu et al., "Access Control: Principles and Practice," IEEE Communications Magazine, IEEE Service Center, New York, NY, vol. 32, No. 9, pp. 40-48 (2-5) (Sep. 1, 1994).
RSA Laboratories, "PKCS#1: RSA Encryption Standard," An RSA Laboratories Technical Note, Version 1.5, 17 pages, Revised Nov. 1, 1993.
Thomas, T., "A Mandatory Access Control Mechanism for the Unix® File System," Proceedings of the Aerospace Computer Security Applications Conference, Orlando, Dec. 12-16, 1988, Washington, IEEE Comp. Soc. Press, US, pp. 173-177, (Dec. 12, 1988).
Donnan, R.A., "Transmission Synchronizing Method," IBM Technical Disclosure Bulletin, vol. 11, No. 11, pp. 1570, (Apr. 1969).
Hinarejos et al, "Revocation Scheme for PMI Based Upon the Tracing of Certificates Chains," Computational Science and its Applications—ICCSA 2006, International Conference, Proceedings (Lecture Notes in Computer Science, vol. 3983), pp. 1098-1106, (Publication Date Unkown).
Official Action for U.S. Appl. No. 11/557,049 (Dec. 17, 2009).
Final Official Action for U.S. Appl. No. 11/342,168 (Nov. 19, 2009).
Interview Summary for U.S. Appl. No. 11/557,052 (Nov. 18, 2009).
Official Action for U.S. Appl. No. 11/557,028 (Nov. 10, 2009).
Final Official Action for U.S. Appl. No. 11/053,273 (Nov. 9, 2009).
Interview Summary for U.S. Appl. No. 11/314,411 (Nov. 3, 2009).

Notice of Abandonment for U.S. Appl. No. 11/557,056 (Oct. 28, 2009).
Interview Summary for U.S. Appl. No. 11/314,052 (Oct. 27, 2009).
Interview Summary for U.S. Appl. No. 11/313,538 (Oct. 23, 2009).
Official Action for U.S. Appl. No. 11/557,039 (Oct. 13, 2009).
Official Action for U.S. Appl. No. 11/557,041 (Oct. 13, 2009).
Official Action for U.S. Appl. No. 11/557,052 (Sep. 29, 2009).
Official Action for U.S. Appl. No. 11/557,051 (Sep. 29, 2009).
Official Action for Chinese Application No. 2006800089822.0 (Aug. 5, 2009).
Official Action for Chinese Application No. 200680009222.3 (Jul. 22, 2009).
Official Action for Chinese Application No. 200680008989.4 (Apr. 24, 2009).
European Examination Report in Application No. 06814655.4, (Feb. 9, 2009).
Random Number Generator, Seed. In Webster's New World™ Computer Dictrionary, Wiley Publishing, Inc. (2003).
PNY Technologies Attache Flash Product, http://www.pny.com/products/flash/attache.asp (Copyright 2003).
Kocher, "On Certificate Revocation and Validation," Lecture Notes in Computer Science, Financial Cryptography (1998).

\* cited by examiner

FIG. 3B  FIG. 3C

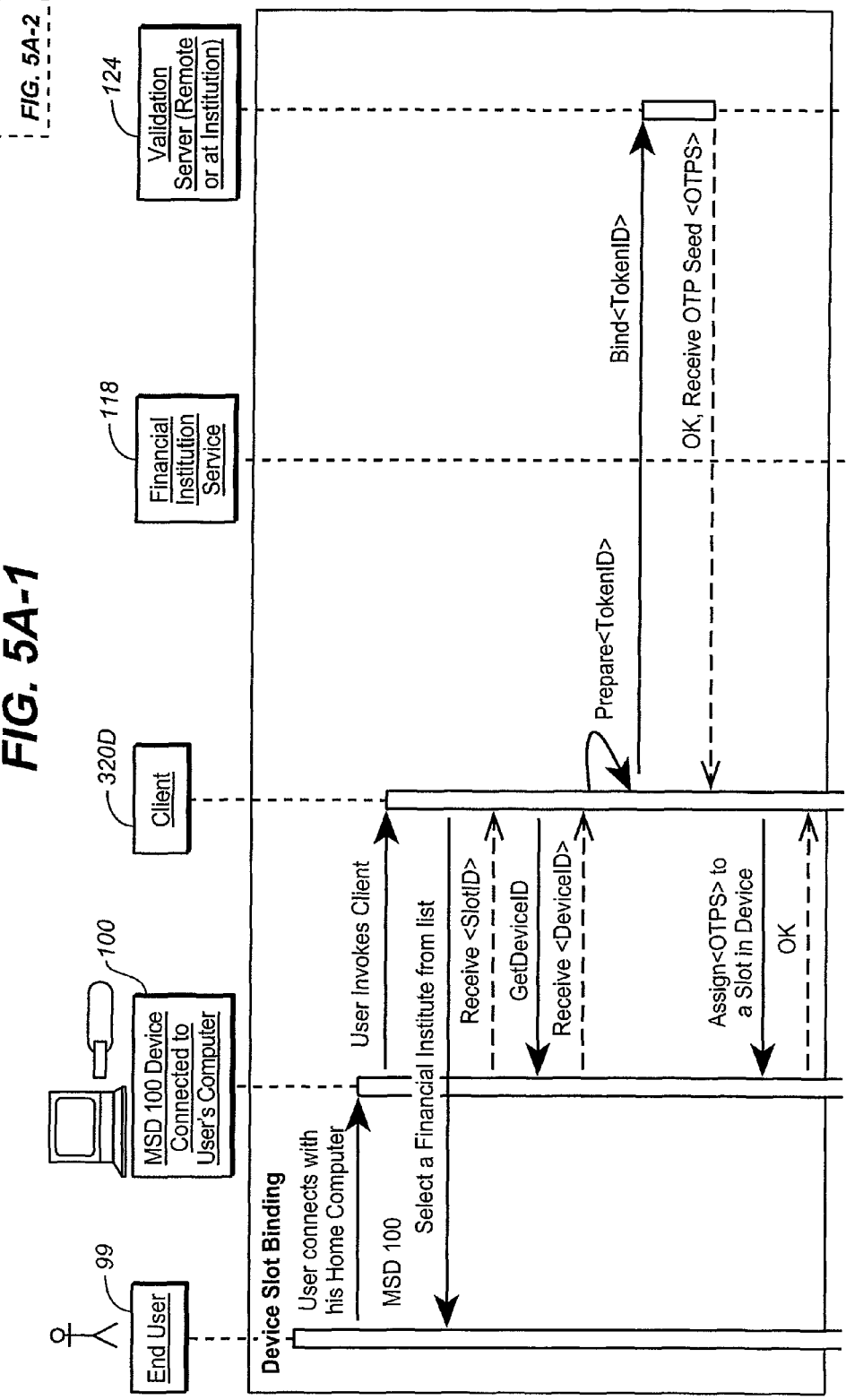

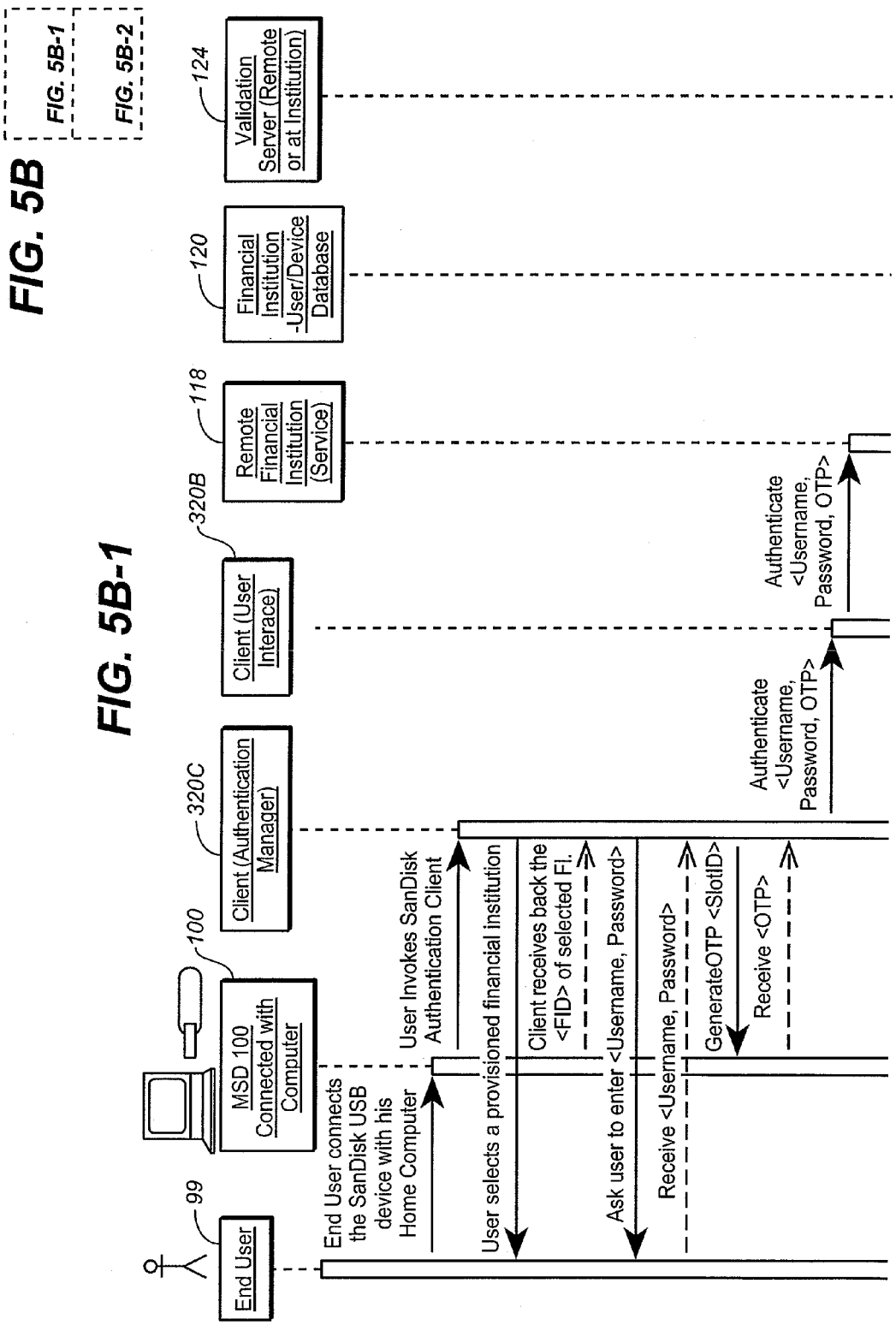

MASS STORAGE DEVICE WITH AUTOMATED CREDENTIALS LOADING

CROSS REFERENCE TO RELATED APPLICATIONS

This application is related to and claims priority from Provisional Application No. 60/697,906, filed on Jul. 8, 2005 entitled "Mass Storage Device With Automated Credentials Loading" to Carlos J. Gonzalez et al.

This application is also related to: application Ser. No. 11/319,259, filed Dec. 27, 2005, entitled "Methods Used in a Mass Storage Device With Automated Credentials Loading" to Carlos J. Gonzalez et al., application Ser. No. 11/285,600, filed Nov. 21, 2005, entitled "Hardware Driver Integrity Check of Memory Card Controller Firmware" to M. Holtzman et al., application Ser. No. 11/317,390, filed Dec. 22, 2005, entitled, "Methods Used in a Secure Memory Card With Life Cycle Phases" to M. Holtzman et al., application Ser. No. 11/317,862, filed Dec. 22, 2005, entitled "Secure Memory Card with Life Cycle Phases" to M. Holtzman et al., application Ser. No. 11/317,341, filed Dec. 22, 2005, entitled "Methods Used in a Secure Yet Flexible System Architecture for Secure Devices With Flash Mass Storage Memory" to M. Holtzman et al., and application Ser. No. 11/317,339, filed Dec. 22, 2005, entitled "Secure Yet Flexible System Architecture for Secure Devices With Flash Mass Storage Memory" to M. Holtzman et al. All of the aforementioned applications and each application referred to in this application are hereby incorporated by this reference in their entireties.

FIELD OF THE INVENTION

The present invention relates generally to portable mass storage devices such as the memory cards and portable universal serial bus ("USB") flash memory drives used to store and transfer large files to and from digital devices, and more specifically to security and access control mechanisms implemented within the devices to access the devices and also other institutions.

BACKGROUND

Remembering passwords is a hassle. The computer at the office requires a user name and password. Each email account requires a user name and password, as does each online account. If security were not an issue, a person would likely have only one username and password for all accounts.

However, security is a serious issue, and therefore password management and access to accounts is also a serious issue. A number of current approaches address this serious issue in an attempt to either make passwords easier to remember or more robust and resistant to being compromised.

One approach is the one time password ("OTP"). A one time password is, generally speaking, a value that can be used to access a system once before it is changed. In other words, it is regularly updated (at a certain defined frequency) without the user having to change it. This means that the user submits a unique (password) value that is used only once and the system that he wishes to access verifies that the value is what it should be. Typically this is accomplished with a small device or "token" that generates the password for the user based upon a predictable algorithm. The same predictable algorithm is utilized by a validating entity in the system, and when the algorithms are given the same seed value, the system therefore "knows" what the user's ever changing one time password value should be at any instant (or count). The most common form of the tokens to date requires that the user read the value from a screen and enter it into a computer. Another recently developed form allows the token to transmit the value directly to the computer. Both of these implementations, and the one time password concept generally, provide a high level of security, but require that the user carry around a token for generation of the one time password values. The tokens are a form of two factor authentication, the user's secret (password or pin) being one factor, and the OTP value and the hardware (token) necessary to produce it being the second factor.

Another approach utilizes a password management device. Such a device can keep track of a user's various passwords and account numbers and submit the proper password(s) for each user account. For example, the user may have a master password for accessing the device, and after the device has verified the user's master password, it can then submit the actual password for a given account when it is connected to a host computer. The user can either enter his various passwords or passwords can be pushed to the password management device. One such device from SafeNet® (formerly thought to be Rainbow Technologies) is known as the iKey™ and is also capable of encryption and the associated key generation.

Each of these approaches lacks something and has therefore not achieved a high level of acceptance with the general public. OTP tokens are primarily used today for controlling access to corporate networks and have not been widely accepted for use with systems widely available to the general public, e.g. email providers or on-line auctioneers etc. Currently available password management devices lack the level of security of OTP tokens and systems.

Each of these approaches requires usage of a dedicated device, or alternatively lacks the ability to generate one time passwords for different institutions while keeping the passwords and associated algorithms and seeds secure. For example, many involve a single purpose keychain token or USB device. Carrying such a device everywhere is an inconvenience and limits user acceptance, especially given that the tech savvy user may already be toting around a cell phone, music player, PDA or Blackberry, digital camera, and other assorted electronic gadgets.

Therefore, there is a need for a convenient multi-purpose device that integrates one time password generation as part of a robust security and password management system.

SUMMARY OF THE INVENTION

The present invention integrates robust security and the convenience of password management into a portable mass storage device. Since a user typically already has a portable mass storage device for use with his digital camera, music player, PDA, or the like, the added security and convenience impose little burden on the user. This facilitates greater penetration of very secure one time password schemes, and results in significantly less risk for sensitive applications such as on-line banking. Because a secure portable mass storage device can store programs and other secure data, OTP generation and password management can be integrated into one convenient platform.

One of the barriers to adoption of such two-factor authentication systems in the consumer space is the need for a user to carry a token specifically for the purpose of performing the authentication operation. One way to eliminate this burden of having to carry multiple dedicated devices is to integrate such functionality into a device that a person may possess and/or carry with them for other reasons. An example of such a mass storage device is a USB flash storage device or a mass storage flash memory card such as a compact flash "CF" card, SD card, MMC card, XD card, Memory Stick, TransFlash card, or the like, which is commonly used to store data, and more recently to store and carry applications. Such a device, according to the present invention, performs the basic OTP functionality and carries a client application that could be launched from the mass storage device and executed on the host computer. The client application is responsible for interacting with the device to perform the OTP operation, and to get the OTP value from the device. In another embodiment, the client itself performs the OTP functionality and stores and retrieves information such as the count to and from the device as needed. In either case, the information would be stored in a secure manner, and protected appropriately by some means such as encryption.

In one embodiment, a single mass storage device may be used to authenticate to a number of independent institutions by maintaining a number of independent seed and count pairs on the device, each one to authenticate independently to a given institution. The authentication with multiple institutions may alternately be achieved with a single seed and count by employing a central location of verifying the authentication information. In either case, the seed or seeds may be loaded into the device or to the client securely either during manufacture of the device, or remotely, preferentially through a secure channel. Secure channels are well known in the art and generally involve a communication protocol whereby communication between two entities is encrypted with a key known only to those two entities. Generally the key is a type of session key that is established with a predefined key exchange protocol between the two entities.

One of the concerns surrounding authentication systems for consumer use is the ease of use and simplicity of the system. Typically, security adds a level of complexity that is a barrier to adoption. One goal in the design of such systems is to achieve a level of simplicity that makes the security aspects of the user interaction almost transparent to the user. To this end, in the present invention, the security is handled in the background as a part of the normal user activities.

This invention involves the integration of the OTP functionality directly into the user log on operation such that the user preferably has no involvement in performing the OTP authentication after some initial enrollment and/or activation. In particular, in the preferred embodiments, the OTP functionality is integrated into a USB flash storage device or other common removable storage device, and a client application is also stored on the device itself. The client application is launched from the storage device and executes on the host computer. The application may be launched either manually by the user or the system may be set up to automatically launch the application upon insertion of the device into a host computer. Once launched, the client application performs the tasks of obtaining an OTP value from the mass storage device, and providing the user identity, credentials, and OTP value to the server to which the user is authenticating. Ideally, this is performed either automatically if the client application is dedicated to operate with a single institution, or with a one-click operation using a human interface device such as a mouse or a keyboard to select either an institution icon (corporate logo) or name from a list.

In another embodiment, the client may be active on the host computer and detect when the user accesses a web page within the list of enrolled institutions in order to activate the log on sequence. The Institution list may be displayed on a graphical user interface ("GUI") as a list, a drop-down list, a group of icons, a group of corporate logos, or other such representations. The user identity and credentials, and the institution Uniform Resource Locator ("URL") or other form of web address are also ideally already stored on the removable storage authentication mass storage device, and are retrieved for the authentication. If the device supports a number of independent OTP seeds, or even if it supports a number of independent institutions using the same OTP seeds, then the user identity, credentials, and URL are ideally selected from a list stored on the device according to the particular institution to which the person is authenticating. This system combines the functions of a traditional password manager and an OTP authentication system seamlessly, and performs the log on and authentication operation all with a single click of a button. Although performing all these actions with a single click is preferable in some scenarios, multiple clicks or other user input may be utilized and preferable in other scenarios.

To ensure that no other person can use the device to authenticate in case of loss or theft, the mass storage device of the present invention is such that it will not work without the user inputting some information that uniquely identifies the person, such as a PIN or password, at least once upon launch of the client application. There are a number of other methods of user identification, such as biometrics, answering questions, etc. In one embodiment, the system may be employed to provide user information for more general two-factor authentication and/or password management operations, some of which information may be more sensitive than other information. The system may be designed to segregate such sensitive information and request user verification, additional entry of a PIN/password, or other action to ensure the user is aware of and authorizes such information to be provided by the system. One example of this may be for credit card authorization and payment.

In one embodiment, the client may provide the user and authentication information to a web server that will upon receiving valid user credentials and authentication information, will automatically fill out the traditional log-in web page entries that are normally used to log on without the two-factor authentication. This embodiment would enable a given institution to maintain a single web log-on page, while adding a separate system component to handle the two factor authentication. In this case, the two-factor authentication may consist of forms of authentication that do not easily lend themselves to form-filling, as OTP does, but instead may be authentication schemes, such as the public key infrastructure ("PKI"), which typically involve challenge-responses operations.

As an enhancement to the system, the device may contain a list of institutions to which the user may enroll for authentication. This list may be updated remotely, either by user request, or automatically, by means of the client application. The list may be organized in such a way as to provide preferential placement for paying institutions, or placement on the list itself may be reserved for only paying institutions. The system may also fill in the user's credentials for him when it detects that a particular web page, for which it has stored credentials, has been opened. This can be done with a program or routine that monitors the port used to communicate with the Internet or WWW. The program monitors the browser installed on the host, and configures the browsers to carry out all data communications with the Internet/WWW through a specific port that it monitors. Monitoring would automatically take place any time the host device is utilized, and would maintain a file of all web sites being visited. If a visited web site is one for which the system maintains the users credentials, it will then log the user on.

One common method of hacking, commonly referred to as 'phishing', is one in which a user is tricked into providing confidential information to a web site disguised as a valid web site. There are a number of ways to counter this form of hacking. The list of participating institutions may be used as a means to provide additional information to the system, such as the valid URLs pertaining to a given institution, the form of authentication or specific protocols employed for authentication, and so on. In one embodiment, the URL embedded in the list of participating institutions may be used to limit the URLs to which a user may enroll with the system. In such an implementation, the list would be preferentially downloaded to the device from a remote server via a secure channel to avoid snooping by third parties. In another implementation, the client may request validation of a URL by establishing a link to a remote server and, preferentially through a secure channel, requesting validation of the URL. The remote server may in one embodiment be an authority server or validation entity such as those seen in FIGS. 1-3. In yet another embodiment, the validation of the website may be performed by some form of authentication using a common method such as PKI with certificates, etc. In one implementation, security is added to the web server to ensure a valid device is connected prior to initiating the authentication process. In another embodiment, the web page may activate services on the PC, which on a Microsoft Windows OS may be ActiveX technology, to interact with the authentication client to determine the presence to the device. In a preferred solution, all validation happens logically between the remote server and the device itself, with the local client performing only facilitation of communication.

All of the above systems include a simple mechanism for transferring the authentication rights from one device to another, as well as the user information and credentials from one device to another. The transferal of authentication rights, which may in one embodiment consist of a device ID and seed, and in others a certificate, key, or other form of information, may be performed by adding the information to a list of inactive devices on the server, a removal of said information from the device via a secure protocol, and a re-provisioning via a secure protocol to a new device upon successful identification of the user, and removal from the list of inactive devices. A similar method may be employed in case of loss of the device by the user, which would entail invalidation of the old device ID and seed at the server, and re-provisioning of the same or new device ID and seed to a new device.

BRIEF DESCRIPTION OF THE FIGURES

FIG. 3B is an illustration of the memory space of mass storage flash memory 308 of FIG. 3A.

FIG. 3C is diagram of the client and one time password generator of mass storage device 100.

DESCRIPTION

Figure 1:
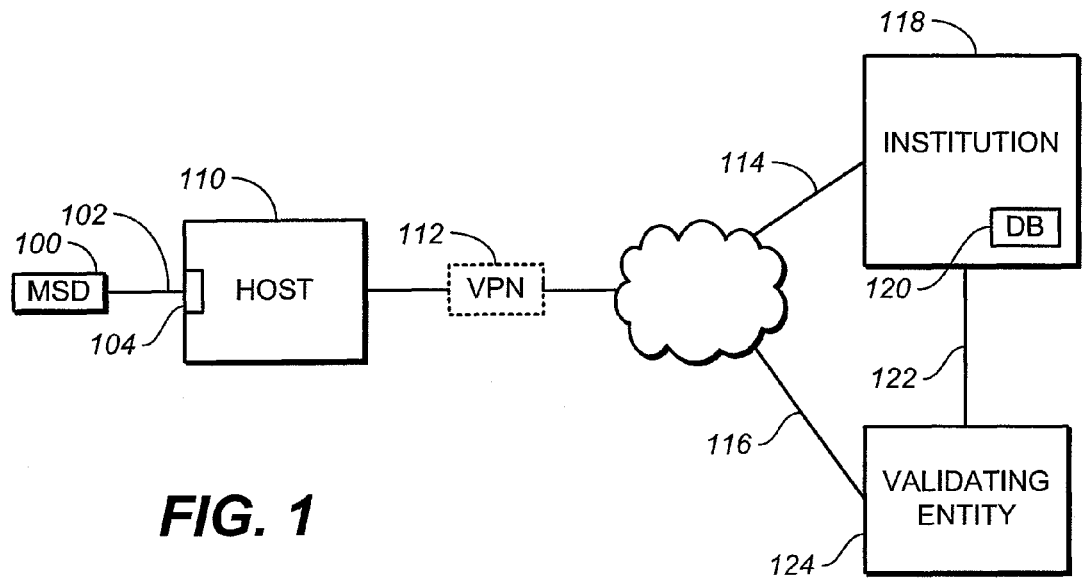
FIG. 1 is a schematic illustration of a first system according to the present invention.

Portable mass storage devices are widely used to store digital content such as photographs, music, videos, and documents. They are also sufficiently large to store large software applications. Typically, the portable mass storage devices now use flash memory for storage purposes, and have a form factor of a memory card or portable USB drive. These mass storage devices are distinct from other portable devices that are intended to store very little information such as that required for transaction or identification purposes. Mass storage devices are also distinct from other dedicated purpose devices such as key cards and the tokens used for authentication, because while the dedicated devices may have small amounts of memory to store pertinent user identification information, they are not designed to frequently store and transfer what are comparatively massive and often encrypted files in a rapid, reliable, and repeatable manner.

For example, a memory card, one embodiment of a portable mass storage device, must be capable of rapidly storing pictures on the order of 5-20 megabytes or more. One single picture from a digital camera may require orders of magnitude more storage than is present in a dedicated purpose device such as a smart card, key card, or token. Furthermore, such a dedicated purpose device is generally not capable of quickly reading and writing files, let alone the relatively large files used with cameras and music players etc. Portable mass storage devices have controllers and firmware with routines that are optimized to read and write to the memory banks very quickly. Furthermore, many of the portable mass storage devices have security and encryption routines to thwart unauthorized copying of the frequently updated content. While dedicated tokens may have some form of security (to protect the seed and/or algorithm), the data on the token is generally static and the security is not designed to protect against unauthorized copying of frequently updated user files. The mass storage device of the present invention may also store the seeds and other information needed for validation and authentication in an area of the mass storage memory that is not subject to logical to physical mapping, in order for the information to be more reliably and quickly retrieved. For more information on this, please refer to application Ser. No.

11/317,341, filed Dec. 22, 2005, entitled "Methods Used in a Secure Yet Flexible System Architecture for Secure Devices With Flash Mass Storage Memory" to M. Holtzman et al., and Application Ser. No. 11/317,339, filed Dec. 22, 2005, entitled "Secure Yet Flexible System Architecture for Secure Devices With Flash Mass Storage Memory" to M. Holtzman et al., which are hereby incorporated by this reference in their entireties. The seeds may also be loaded into hidden partitions of the device. Loading of the seeds, wherever they are stored, may also only be possible if the entity wishing to load the seeds has adequate permission and/or credentials to do so. In certain embodiments, this permission is contained in an access control record, which will be discussed later.

The present invention utilizes a portable mass storage device for security purposes. The device has security features built into the device that i) limit access to information stored on the device, and ii) make the device function as a type of "key" that allows access to other secure systems and data. The present invention also includes a system that uses a portable mass storage device to verify the credentials of a user. Once verified the user will be allowed access to information he would otherwise not be able to access.

Typically static passwords have been used to verify the credentials of a user. However, a static password is easy to pilfer and affords little protection, especially given the widespread "phishing" for passwords and other personal information today. As discussed previously in the Background, dedicated OTP token systems have also been implemented. These dedicated tokens are a burden to carry, are costly, and have not been widely accepted in the marketplace. These tokens also do not have the mass storage functionality of a memory card or USB drive.

Today, almost everybody who has a digital camera, video recorder, PDA, portable music player, or personal computer has a memory card or a pocket sized USB drive, sometimes referred to as a "thumb" drive. The present invention removes the barrier to entry of requiring a separate dedicated token (or other dedicated device) for implementing an OTP. If a user need not carry multiple devices, but can instead utilize something he already has, the acceptance and usage of OTP and two factor authentication should grow substantially. This results in better security measures and less risk of fraud in electronic commerce and other areas.

Embodiments of this invention comprise a portable storage device such as a USB flash storage device with OTP functionality and a client in the device that upon selection by the user will automatically link to the appropriate institution web page, enter user credentials, perform the OTP transaction with the device, and enter the OTP value to the web page, thus seamlessly performing the entire operation with a single user click.

Increased security measures are of the utmost importance because identify theft and fraud are becoming ever greater threats to the growth of online financial activity. Banks, brokerages, and other financial institutions are seeking solutions that will enable them to drive more activity online, where the costs can be as little as 0.5% per transaction as compared to the same transaction performed in a branch office. Likewise there are other programs that are being developed around online merchant transaction, safe browsing for children, and so on. The fundamental need of each of these is a means to provide stronger authentication of the individual that overcomes the most common forms of identify theft, which are phishing and hacking to obtain user identity and credentials, and physical theft or copying of credit card information.

One solution to the problem, and one aspect of the present invention is to provide consumers with a means, or system, of performing two-factor authentication in order to log on or perform transactions online. Two-factor authentication, as implied by the name, requires that a person be in possession of two system components, one of which is typically a physical device uniquely identifying the person, and the other is a piece of information (a secret) that is known only to that person and the entity to which the person would like to authenticate.

The authenticating or validating entity will typically have a database containing the person's credentials as well as a means of verifying that the person is in possession of both components of the two-factor authentication system. The person is only authenticated if able to prove possession of both components, and so the most common form of fraud, in which a hacker is able to determine the person's identity and secret, is thwarted, because the hacker, who typically is never physically near the person, will not have possession of the physical component. Likewise, if the person happens to lose the device, or it is stolen, no one can use the physical component to falsely authenticate without knowledge of the secret.

The present invention includes cryptographic functionality. In a preferred embodiment it includes a hardware-based cryptographic engine, although the cryptographic functionality can alternatively be primarily firmware based. It is advantageous to include some form of cryptography to increase the effort that would be required to hack the system. An advantage of using a hardware based cryptographic engine is that the firmware can be tied to the cryptographic engine in such a way that the firmware won't be executed unless singed by the hardware. This means that both the authentic firmware and hardware need to be present for the device to work. One or the other cannot be replaced with pieces designed to compromise the security of the device and allow unauthorized copying of the contents. For more information please refer to U.S. patent application Ser. No. 11/285,600, filed Nov. 21, 2005, entitled "Hardware Driver Integrity Check of Memory Card Controller Firmware" to Holtzman et al, which is hereby incorporated by this reference in its entirety.

A PC or cell phone has an open architecture which is vulnerable to all forms of hacking. An advantage of the present invention is that by placing the cryptographic capabilities within the mass storage device, a very secure and limited API can be utilized as compared to what would be present on a typical personal computer ("PC") or electronic device such as a cellular telephone. The secure API of the mass storage device is such that there is no way for hackers to use a normal logical interface to attempt to discern the cryptographic secrets contained within the mass storage device. In essence the mass storage device of the present invention is made to be much more secure than the host to which it is coupled.

The secure mass storage device works in tandem with a remotely located server or servers, using the host device essentially as a pass-through. Although in certain embodiments the processor of the host device executes a client that is stored on the mass storage device, in the preferred embodiments the cryptographic and OTP operations are contained exclusively in the mass storage device, which can be constructed, both physically and logically, in a much more protected manner. The secure mass storage device works in conjunction with a remotely located secure entity or entities to form a secure system. Connections between the mass storage device and the secure entities are also secure. The remotely located secure entity is or comprises one or more remote servers, which are typically physically protected from access, and have secure countermeasures that limit the types of interactions that can be performed though the external interface.

Reference will now be made to the figures. FIG. 1 illustrates a system with which the portable mass storage device ("MSD") can be used for authentication and password management. MSD 100 is connected to a host computing device 110 via connection 102. Connection 102 can be any type of direct or wireless connection. Some examples of a wireless connection include: OTA—over the air—which uses standard phone communication link; radio frequencies some of which involved selected ranges and protocols such as wi-fi (802.11x) and Bluetooth; inductive near field communications ("NFC"); and infrared. In the currently preferred embodiments, MSD 100 takes the form of a USB drive or a memory card, and therefore the connection is direct and the MSD will interface with a receptacle 104 of the host device. As will be discussed in greater detail later, MSD 100 has a mass storage memory used to frequently and rapidly store and retrieve large user files. These user files can be any type of file and commonly include digital photos and music, as well as executable software programs. In the case of a wireless connection 102, receptacle 104 would not be a physical receptacle but would instead be a wireless transceiver.

Host computing device 110 can be any type of smart electronic device, and will for convenience be simply referred to as the host. Some examples of host 110 would include a personal computer, cellular telephone, or handheld organizer/email device ("PDA"). In fact, the host can be any electronic device that can be used to access a user's accounts and/or sites of interest. Host 110 is connected to a network that is in turn connected with various institutions 118 and other entities. Only one institution 118 is shown for simplicity. The network may comprise any type of wide area network such as the Internet, and various types of cellular telephone networks. Certain networks may also utilize satellite communications. One type of entity connected to the network is a validating or authenticating entity 124. Entity 124 comprises one or more servers. In the case where host 110 is a PC, a virtual private network ("VPN") connection may be established if desired. In addition to network connection 114 that connects the host to the institution 118, and network connection 116, that connects the host to the validating entity 124, there may also exist a separate, non-network connection 122 between institution 118 and validating entity 124. Certainly institutions 118 can also communicate with entities 124 over the network as well.

Host 110 and the components that interact with it will now be described with reference to their currently preferred embodiments, but such a description should in no way limit the scope of the invention, which will be defined by the appended claims. In a preferred embodiment, host 110 is a PC and MSD 100 is a USB thumb drive. As mentioned previously, the host computer may also be a handheld computer, commonly referred to as a PDA, or a cellular phone, or digital camera, or a hybrid device having all of these functions, which may accept a removable storage device. In one embodiment, the storage device or subsystem may be embedded in the host computer. When a user wishes to access a particular institution, say his online bank for example, he plugs MSD 100 into a USB port, a client that resides on MSD is launched by the PC, and the client then signs the user into his bank account or accounts. The validating entity 124 works in conjunction with the institution, the client, the PC, and the MSD, to validate/authorize the user and his MSD before the user will be allowed access to the institution and logged on or signed into the institution. Of course, each institution 118 maintains various databases of its users and their account numbers and secrets (e.g. passwords or PIN numbers). Likewise, the validating entities maintain databases needed to validate/authorize the users and their devices. These processes will be discussed in greater detail later. Also, the client application that resides on MSD 100 can be executed by a processor of host 110 or MSD 100, and this will depend on the level of security required and the configurations of both host 110 and MSD 100, as well as the connection 102 between them. In the case where host 110 is a PC, at the moment it is currently preferred that the PC execute the client application.

Figure 2:
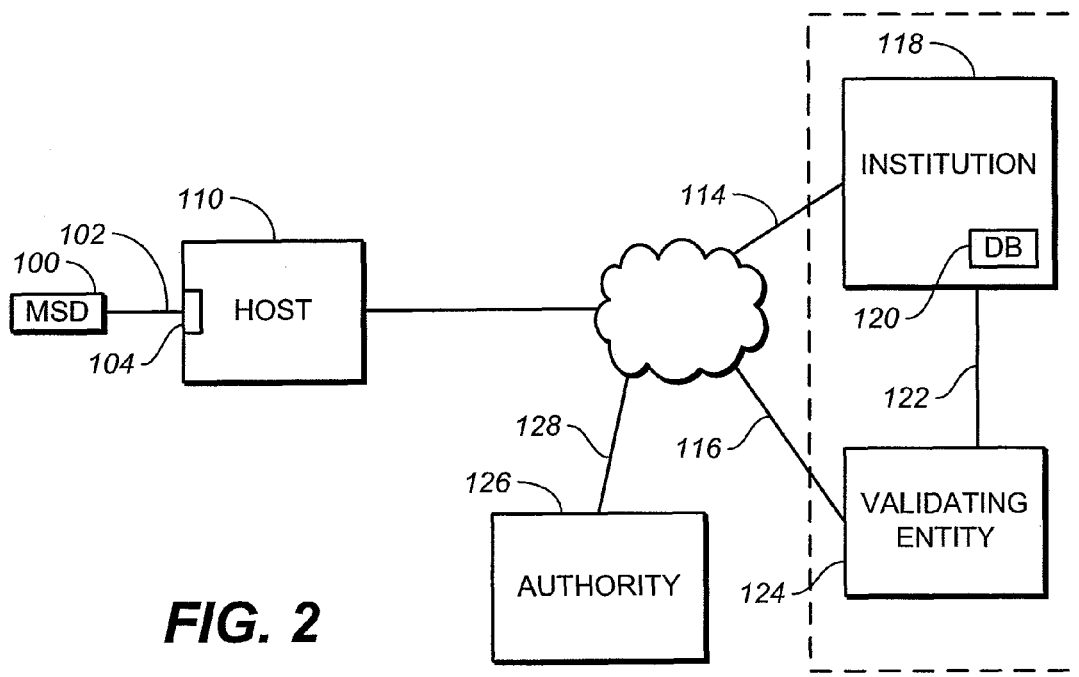
FIG. 2 is schematic illustration of a second system according to the present invention.

FIG. 2 is similar to FIG. 1 but it makes it clear that the validating entity, which comprises one or more servers, can be on the same premises as the institution and its equipment. In addition, it illustrates an authority 126. The authority is an entity that provides information to MSD 100 that is necessary for validation/authorization and user sign on. Authority 126 will also be referred to as authority server 126. For example, the authority 126 may provide the seeds necessary for OTP generation within MSD 100. Authority 126 is shown as connected to the host 110 via the network connection 128. In such a scenario, the authority can load the seeds into MSD 100 at any time during the usable life of MSD 100. It could also change and remove the seeds if necessary. In a scenario where the seeds are loaded at the factory, authority 126 could be directly connected to the MSD without having to connect via a network and host device. Authority 126 could be run by any number of companies or other entities. One such entity might be the manufacturer or provider of the device. For instance, if MSD is produced by SanDisk, the assignee of the present invention, the authority may also be SanDisk or its agent. As another example, authority 126 may be a device distributor such an as employer. Also, the institution 118 or validating entity 124 may provide the information necessary for validation/authorization (e.g. OTP seeds), directly in place of or in conjunction with authority 126.

Figure 3A:
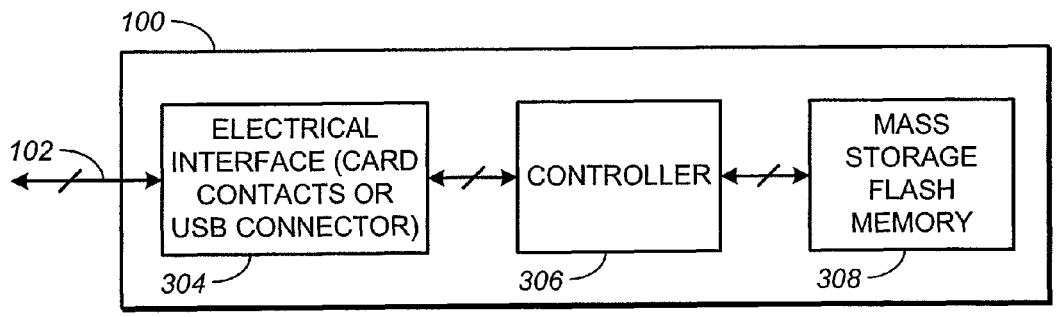
FIG. 3A is block diagram of mass storage device 100.

FIG. 3A illustrates some of the physical components of MSD 100. Interface 304 sends and receives data and commands to and from MSD 100 and communicates the information with controller 306. As mentioned previously, interface 304 in some embodiments comprises the electrical contacts and/or connector of the mass storage device, while in other embodiments it comprises a wireless transceiver. In certain of the embodiments, power for MSD 100 may also be received via device interface 304. Controller 306 comprises a microprocessor and it controls all of the data storage operations of MSD 100. This means that it orchestrates all of the read and write operations to and from the mass storage memory 308, which is preferably of the flash variety. Although the controller and mass storage memory are illustrated as being connected serially, they are in reality normally connected via a bus. Also on the bus may be various other components including read only memory ("ROM") and random access memory ("RAM"). MSD 100 is capable of reading and writing encrypted files in mass storage memory 308, and this is accomplished in the preferred embodiments with an encryption engine within controller 306. The controller executes firmware in order to run MSD 100, and this firmware can be located on a dedicated ROM, or alternatively stored in the flash memory 308. The firmware is preferably stored in mass storage memory 308, in order to eliminate the cost of a ROM to store the firmware. Storing the firmware that runs the MSD in the flash memory 308, which lacks the intrinsic protection of a ROM, requires extensive protection mechanisms in MSD 100 that ensure that the copy protection routines in the firmware cannot be tampered with or that the firmware cannot be entirely replaced with malicious/unsecure firmware.

As seen in FIG. 3B, flash memory 308 has a secure area 308A where the firmware and other information essential to the operation of the MSD is located. In some embodiments, the firmware is encrypted and will not be executed unless it is first determined to be authentic. For more information on authentication of firmware please refer to application Ser. No. 11/285,600, filed Nov. 21, 2005, entitled "Hardware Driver Integrity Check of Memory Card Controller Firmware" to Holtzman et al., incorporated by reference in its entirety. Also, in some embodiments, writing to the secure area 308 can only be performed in certain operating states of the device. Generally speaking, this also serves to protect from tampering or replacement of the firmware, and for more information on operating states of the mass storage device, please see application Ser. No. 11/053,273, filed Feb. 7, 2005, entitled "Secure Memory Card with Life Cycle Phases" to M. Holtzman et al., incorporated by reference in its entirety. These protections need to be in place because the mass storage device is used for general purpose file storage, and in particular to store copyrighted works that cannot be freely available for copying. For example, music on the MSD must be protected from unauthorized copying (this is not an issue with dedicated tokens that cannot be used to store user files). This is of particular importance when the firmware for controlling the device resides in the same mass storage memory as the user files, rather than on a dedicated storage device such as a ROM, that is intrinsically more difficult to hack.

Logical slots 310A, 310B ... 310x. are located in the secure area 308A. These slots can also be in the file storage area 308B. A slot is a protected logical memory area that is used to store the information necessary to log a user into an institution. The information is encrypted as one security measure. This can include the user's identifying information such as his name address account number etc. . . . , the user's secret such as a password or PIN, and the information necessary to generate OTP values, including the algorithms and seed values for each institution. Each institution will have its own slot. In certain embodiments, each account within an institution may have its own slot. Login and the use of slots will be explained in more detail later. In an embodiment of the invention, the slots of the MSD may be located in a system area of the mass storage memory that is not subject to logical to physical mapping, in order for the information to be more reliably and quickly retrieved. The seeds used for OTP generation may also be stored in an area of memory 308 that is hidden from a computer that has access to the files in file storage area 308B. This may be done within a hidden partition located anywhere in memory 308.

As mentioned previously, seeds can be loaded into MSD 100 at different times. It is important that an entity wishing to load seeds into the card be verified before loading takes place. In one embodiment, this is managed with a secure storage application ("SSA"), which is a security module of the mass storage device. This can interact with the client application 320 or through a management layer within the device. The SSA and other related information is described in patent application Ser. No. 11/313,536, entitled "Control Structure for Versatile Content Control," to Fabrice Jogand-Coulomb et al, which is hereby incorporated by this reference in its entirety. The SSA system sits atop the storage system of the MSD and adds a security layer for stored files and other data, including, in one embodiment, the seeds.

SSA partitions are hidden (from the host operating system or OS and all other entities) partitions that can be accessed only through the SSA. The SSA system will preferably not allow the host device or other entity to access an SSA partition, other than through a session established by logging onto an access control record ("ACR"). Similarly, preferably the SSA will not provide information regarding the existence, size and access permission of an SSA partition, unless this request is coming through an established session by an appropriate authority or entity.

Access rights to partitions are derived from a list of permissions contained within the ACR. An ACR also may contain the login algorithm, credentials, and authentication method of or to be used with an entity. When a partition is created, the host provides a reference name or ID for the partition. This reference is used in further read and write commands to the partition. Therefore, in such an embodiment, in order for an entity wishing to load a seed in the MSD, it would have to have the proper permission and/or the proper login algorithm, credentials, and authentication method.

FIG. 3C illustrates the divided functionality of the preferred embodiments of MSD 100. In the preferred embodiments, client application 320 performs many functions, but does not perform the OTP generation. In the preferred embodiments, as discussed earlier, the client is executed on the host (although stored on the MSD), whereas the OTP generation is performed on the MSD. OTP generator 330 is better protected within the secure environs of MSD 100, as compared to the relatively open and potentially insecure environments that may be present in various host devices. Client 320 will request and subsequently fetch the OTP value generated by OTP generator 330. OTP generator 330 can use multiple different algorithms in order to provide more security and functionality than prior OTP tokens only capable of using a single algorithm seeded at the time of manufacture. For example, OTP generator 330 can use a unique value generating algorithm for each institution. The OTP generator can be implemented in the logic of the controller 306, in a programmable logic device, or in a separate dedicated circuitry. The dedicated circuitry can be implemented in an ASIC or with board level circuitry components.

Client 320 also comprises the device interface 320A, user interface 320B, authentication manager 320C, and provisioning manager 320D. Client 320 seamlessly logs a user onto his chosen institutions based on user interaction with the user interface 320A. The user interface triggers the device interface, authentication manager, and provisioning manager without the knowledge or intervention of the user.

Figure 4:
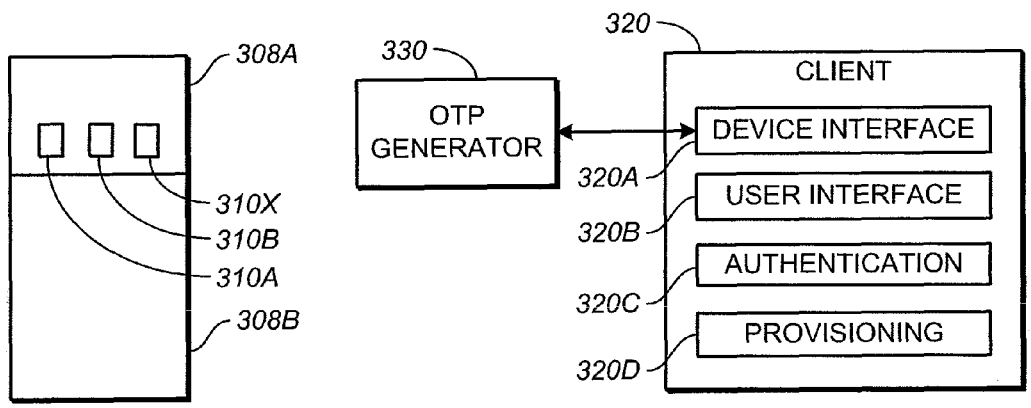
FIG. 4 is an illustration of the functionality of mass storage device 100.
Figure 4:
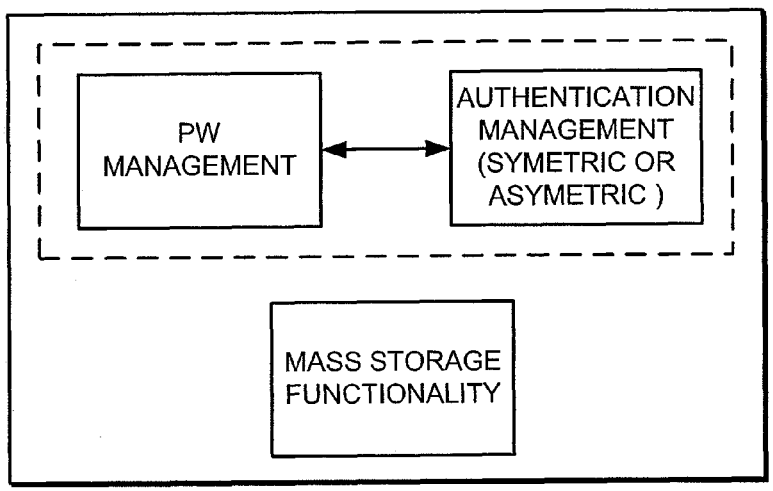

FIG. 4 illustrates the multi purpose functionality of device 100. MSD 100 has mass storage functionality. This is why a user typically has MSD 100, to store his files in a convenient pocket sized device. Now the present invention adds the convenience of account management and sign on. This involves both password management and authentication management. Authentication management includes verifying that both the user and his device are who they purport to be and are authorized to access secure institutions. Authentication management involves the usage of specific device identifiers and also the one time passwords generated by OTP generator 330. Adding the security of OTP generation and two factor authentication to a device a user already has should greatly increase the adoption of OTP usage. Adding the convenience of managing the multiple passwords a person typically has should also make such a device much more interesting and valuable to the user. The increased security, functionality, and convenience will result in a higher acceptance level of two factor authentication at secure institutions as well as among users.

The intricacies of the processes will now be described in detail with regard to FIGS. 5A-10C.

FIG. 6C outlines two principle steps. First, in step 604, MSD 100 receives one or more OTP seeds while the device is in the field, or in other words after it has been sold and is in the possession of the user. In one embodiment, one seed per institution is received in the card. In other embodiments, one seed is used to generate values for two or more institutions. While various seeds can be pre-loaded in the device before it is sold to the user or an intermediary, it is preferred that the seeds can be loaded on the fly. Later, in step 608 the received seed(s) are used to sign into various institution(s) with the portable mass storage device 100. Before the seeds are loaded on the fly, the client may in certain embodiments verify that the MSD connected to the host is capable of performing the requisite OTP generation. One way of doing this is with ActiveX.

Figures 2, 5A:
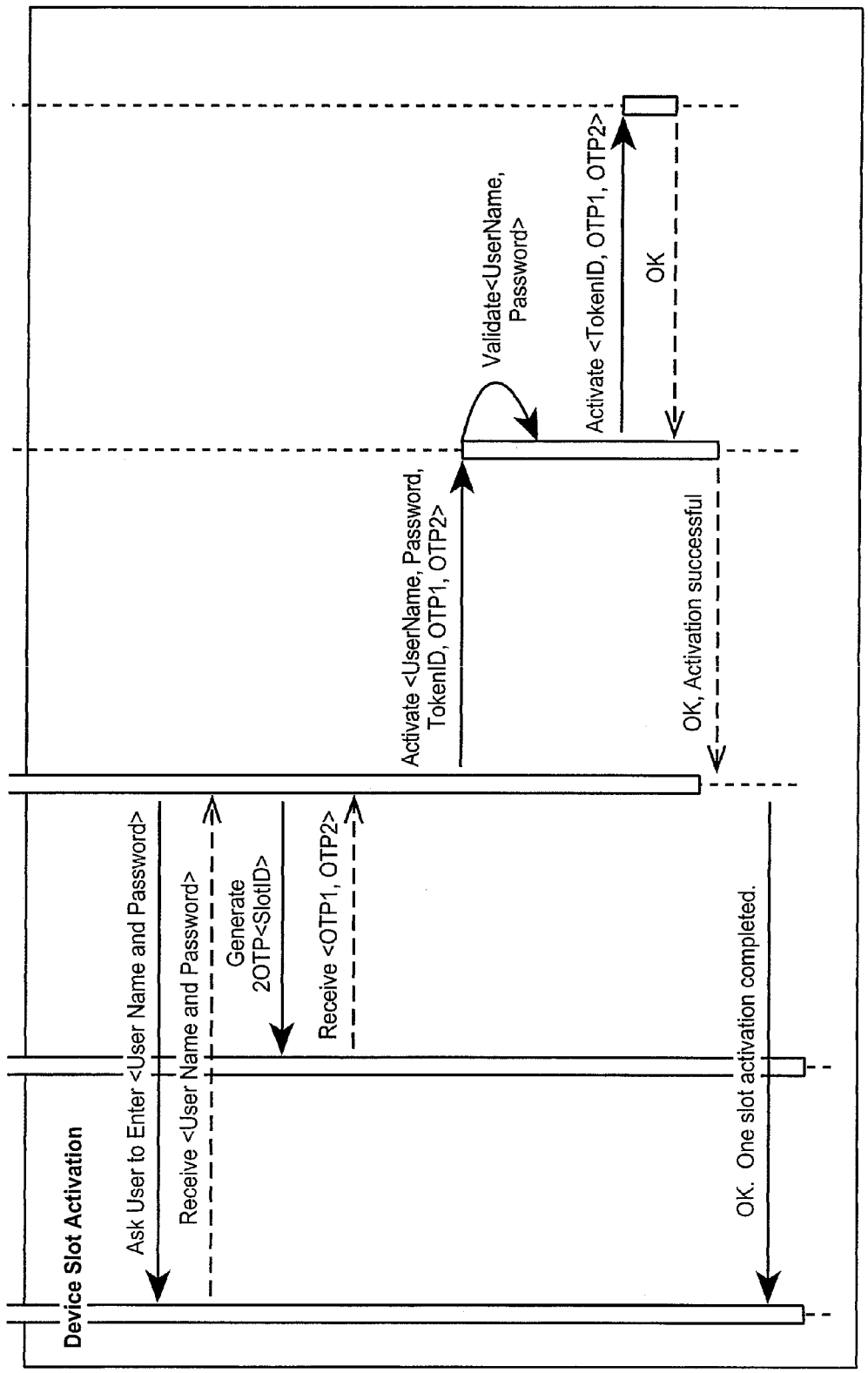
FIG. 5A is an illustration of the entities and interactions involved in device slot binding and device slot activation.
Figures 2, 5B:
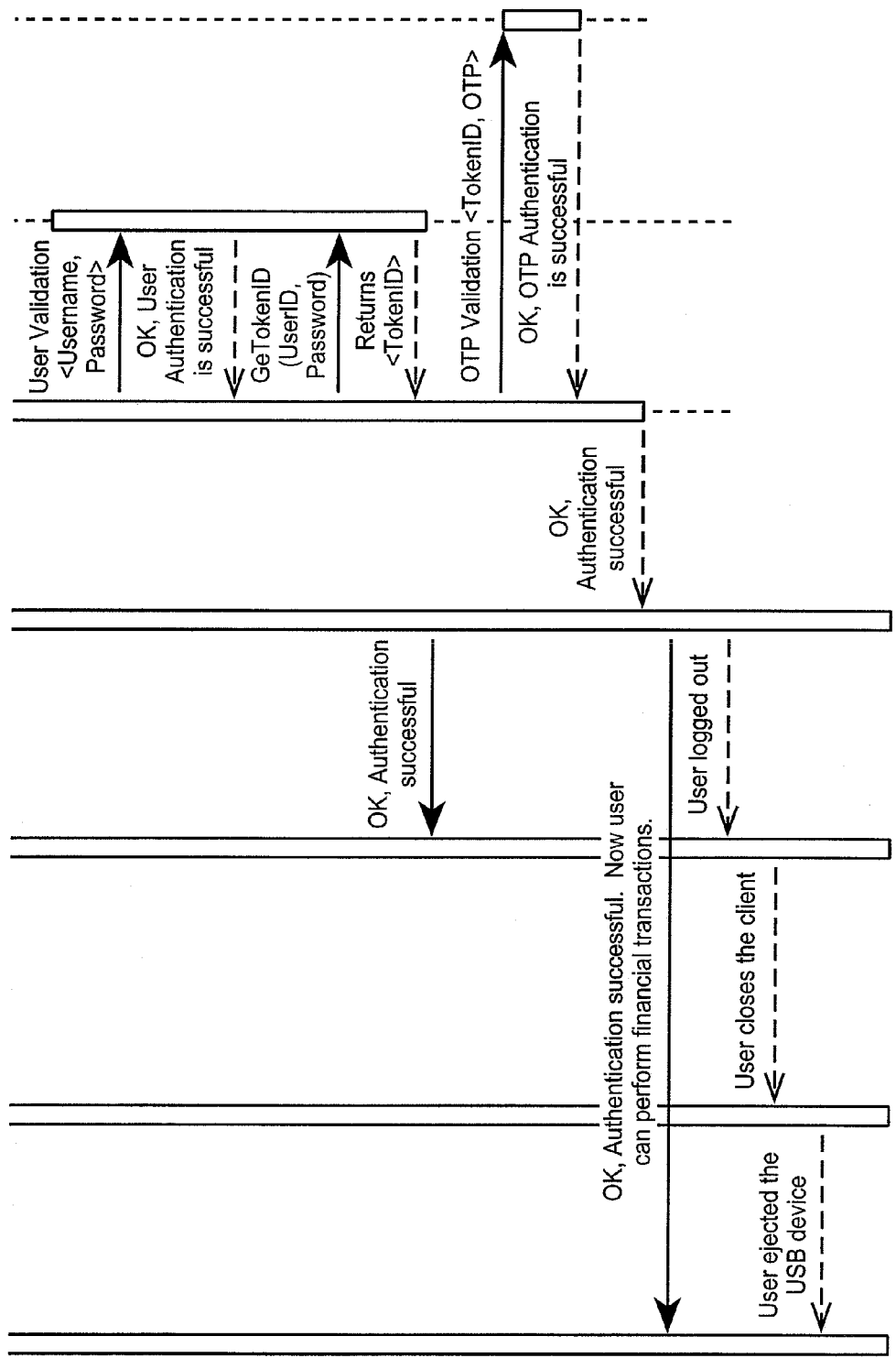
FIG. 5B is an illustration of the entities and interactions involved in authentication of a device with a bound slot.

FIGS. 5A and 5B and the flowcharts of FIGS. 7-10C should be viewed in tandem. FIG. 5A shows the interaction between each of the entities involved in device slot binding and device slot activation: end user 99, MSD 100, client 320, institution 118, and validating entity 124. Device slot binding and activation are performed before MSD 100 can be used to access a particular institution. FIG. 5B shows the interaction between each of the entities involved in accessing an institution once a slot of MSD 100 is already bound and activated. The entities illustrated in FIGS. 5A and 5B are largely the same, but different functionality of the client 320 is utilized and illustrated. For instance, in FIG. 5B, the authentication manager 320C and user interface 320B of client are involved in the processes, whereas the provisioning manager 320D of client 320 is active during the device slot binding and activation seen in FIG. 5A. Also, the institution database 120 of institution 118 is illustrated as a separate logical entity, although it is part of the institution 118.

Figure 7:
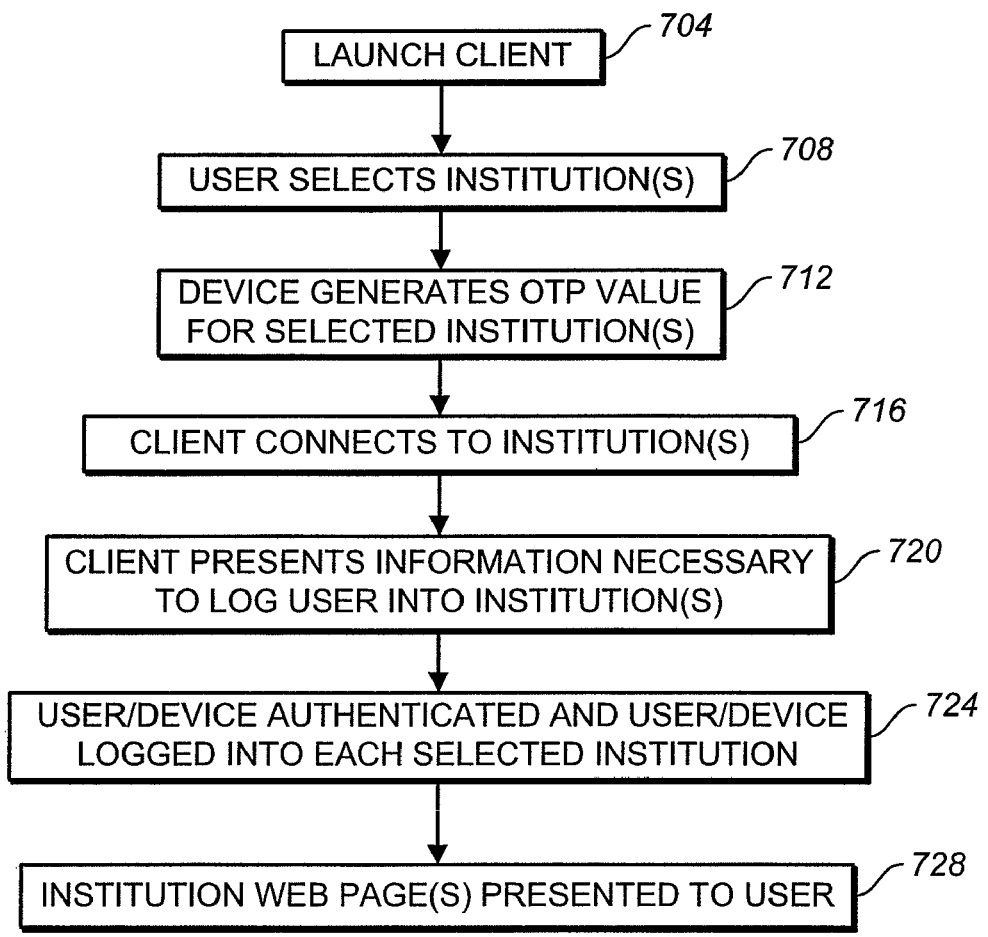
FIG. 7 is a flowchart of a method of use of mass storage device 100 to sign into institutions, according to an embodiment of the present invention.

FIG. 7 is a flowchart illustrating the main steps of using MSD 100 to access an institution, at a high level. In step 704, after MSD 100 has been connected to the computer, the client is launched. The client can be launched by the user, or alternatively can be automatically launched when the connection to the computer is sensed. Next, in step 708, the user selects the institution he wishes to access though the user interface of the client. Some user interface screens can be seen in FIGS. 11-12, and will be described later. Generally the selection will be made via human interface devices of the computer each time the client is launched. However, the user can configure MSD 100 to automatically access an institution when the connection is sensed and the client is launched.

In step 712, MSD 100 generates an OTP value for each of the selected institutions. Each institution may have a unique seed and algorithm for OTP generation. In step 716, the client connects to the selected institutions. Once connected, the client then presents the information necessary to log the user into the selected institutions. This information comprises the user's identifying information such as his name, account number, or user ID, the user's secret information such as his password or PIN, and the OTP value for the particular institution if the institution is of the type that requires an OTP value for log in. The information can be gathered from a page of the client user interface that the user fills in, or can be gathered by monitoring the actions of a user as he enters his information in the web page of an institution. In one embodiment, the client may provide the user and authentication information to a web server that will upon receiving valid user credentials and authentication information, will automatically fill out the traditional log-in web page entries that are normally used to log on without the two-factor authentication. This embodiment would enable a given institution to maintain a single web log-on page, while adding a separate system component to handle the two factor authentication. In certain embodiments, the device ID of MSD 100 may also be necessary to log in. In step 724, user 99 and device 100 are authenticated/validated and the user/device are logged into each selected institution. Finally, once the user is logged in, he can access the institution. In the case where the user is accessing a web site of an institution, the institution web pages are presented to the user in step 728. Of course, institution interfaces are not limited to web pages, and access of other interfaces are within the scope of the present invention. This is especially relevant when host 110 is something other than a PC.

Figure 8:
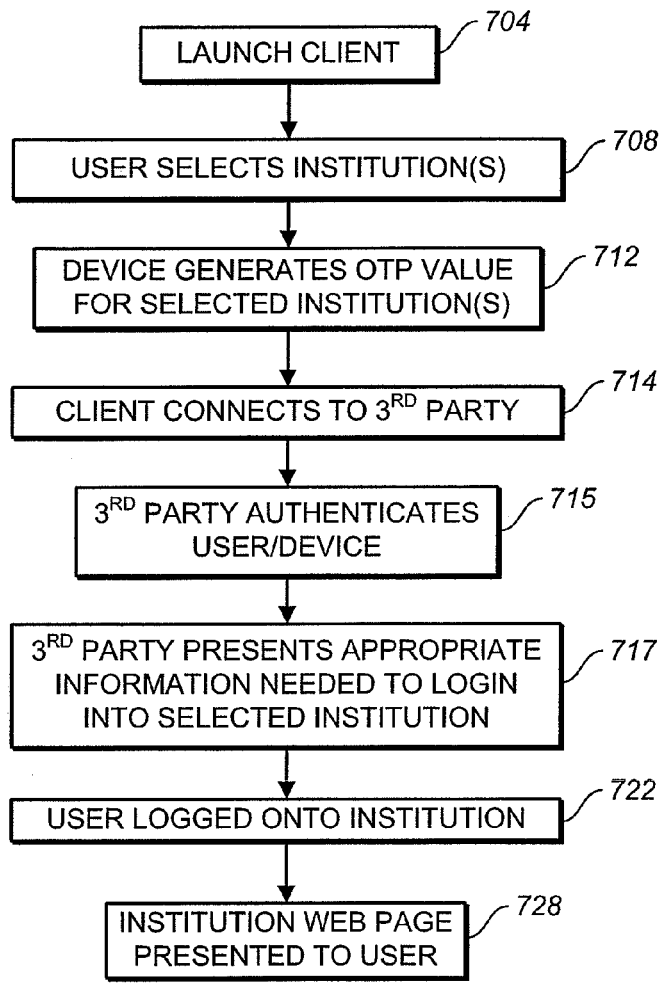
FIG. 8 is a flowchart of a method of use of mass storage device 100 to sign into institutions, according to an embodiment of the present invention.

FIG. 8 is a flowchart similar to FIG. 7, but in FIG. 8 a third party, which is a party other than the institution and the user/device, takes a role in logging the user into an institution. Only steps differing from that in FIG. 7 will be described. In step 714, the client connects the user/device/host to a $3^{rd}$ party rather than to an institution as in step 716 of FIG. 7. This $3^{rd}$ party maintains databases of users, devices, institutions, and all the information needed to verify the authenticity and validity of a user and his device. This may include verifying OTP values generated by the MSD. In step 717, the $3^{rd}$ party authenticates/validates the user/device. Once this happens, the $3^{rd}$ party presents the appropriate information needed to log the user into his selected institutions in step 717. The $3^{rd}$ party may present OTP values generated either at the MSD level or by the $3^{rd}$ party itself. In step 722 the user is then logged into the institution.

Figure 9:
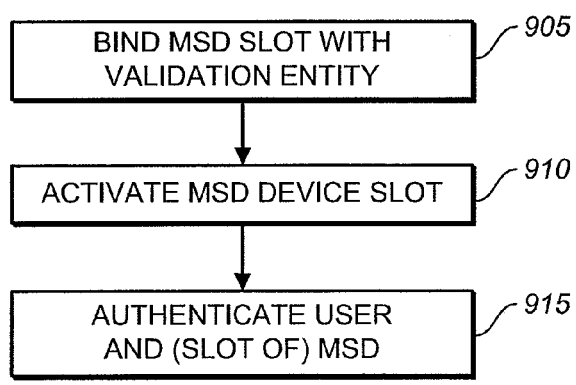
FIG. 9 is a flowchart of a method of use of mass storage device 100 to sign into institutions, according to an embodiment of the present invention.

As mentioned previously, before MSD 100 can be used to log a user into his selected sites, slots within the device should be bound and activated. The user and device must also be authenticated before login is completed, as seen in FIG. 9. In step 905 a slot 310 of MSD 100 is bound with a server of the validating entity 124, which can also be referred to as validation server 124. This step is described in more detail in the flowchart of FIG. 10 and is also shown in FIG. 5A. Next, in step 910, the slot is activated. This process of activation is described in more detail in the flowchart of FIG. 10B and is also shown in FIG. 5A. In step 915, the user and slot of MSD 100 is authenticated. This authentication or validation process is described in more detail in the flowchart of FIG. 10C and can also bee seen in FIG. 5B.

Figures 10A, 10B:
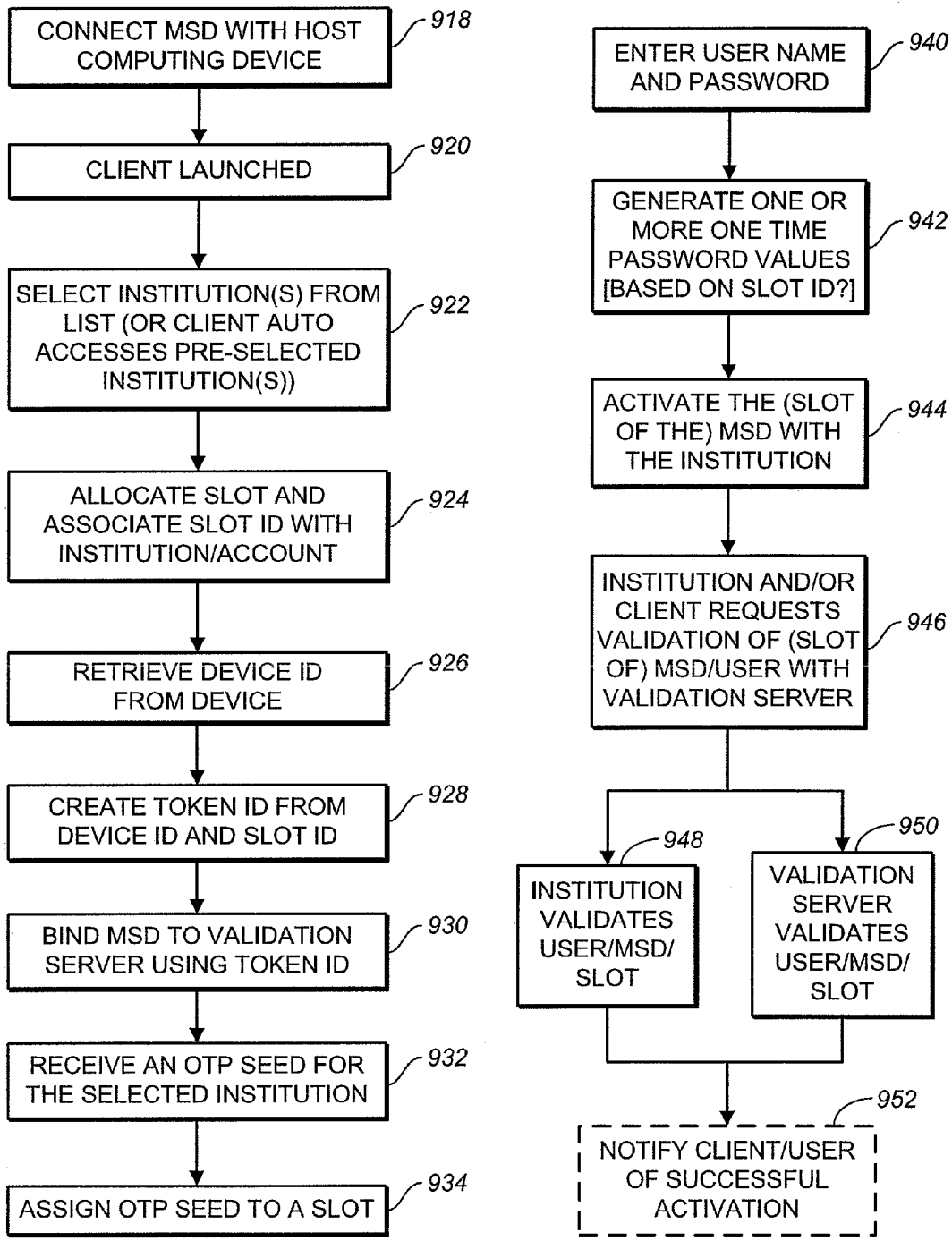
FIG. 10A is a flowchart of device slot binding as seen in step 905 of FIG. 9.
FIG. 10B is a flowchart of device slot activation as seen in step 910 of FIG. 9.

FIG. 10A illustrates the process of binding (step 905 of FIG. 9) in detail. In step 918 the MSD is first connected to host 110. In step 920, the client is launched. Next, in step 922 the user selects an institution he wishes to sign into. Again, the user can do this at this time, or the institutions may be pre-selected from previous user session. In step 924, a slot within MSD 100 is then allocated for the selected institution or account. In step 926 the clients retrieves the device ID from MSD 100. Then in step 928, a unique identifier, which is referred to as the token ID is created from the device ID and the slot ID. In step 930, MSD 100, in particular the appropriate slot of MSD 100, is bound to the validation server 128 using the token ID. In step 932, an OTP seed is received for the selected institution, and it is then assigned to the allocated slot in step 934. Steps 924-934 are repeated for each institution selected in step 922.

FIG. 10B illustrates the process of device slot activation (step 910 of FIG. 9) in detail. A device slot can be activated after it has been bound. In step 940, the user enters his user name or other user identifying information and his password or other secret. Next, in step 942, the OTP generator 330 of MSD 100 generates one or more one time password values for the slot being activated. In step 944, the slot of the MSD is activated with the institution, and in step 946 the institution and/or the client then requests validation of the slot/MSD/user with the validation server 124. At the same time, the institution 118 and the validation server 124 validate the slot/MSD/user in steps 948 and 950. Then, optionally in step 952, the client and user are notified of the successful activation.

Figure 10C:
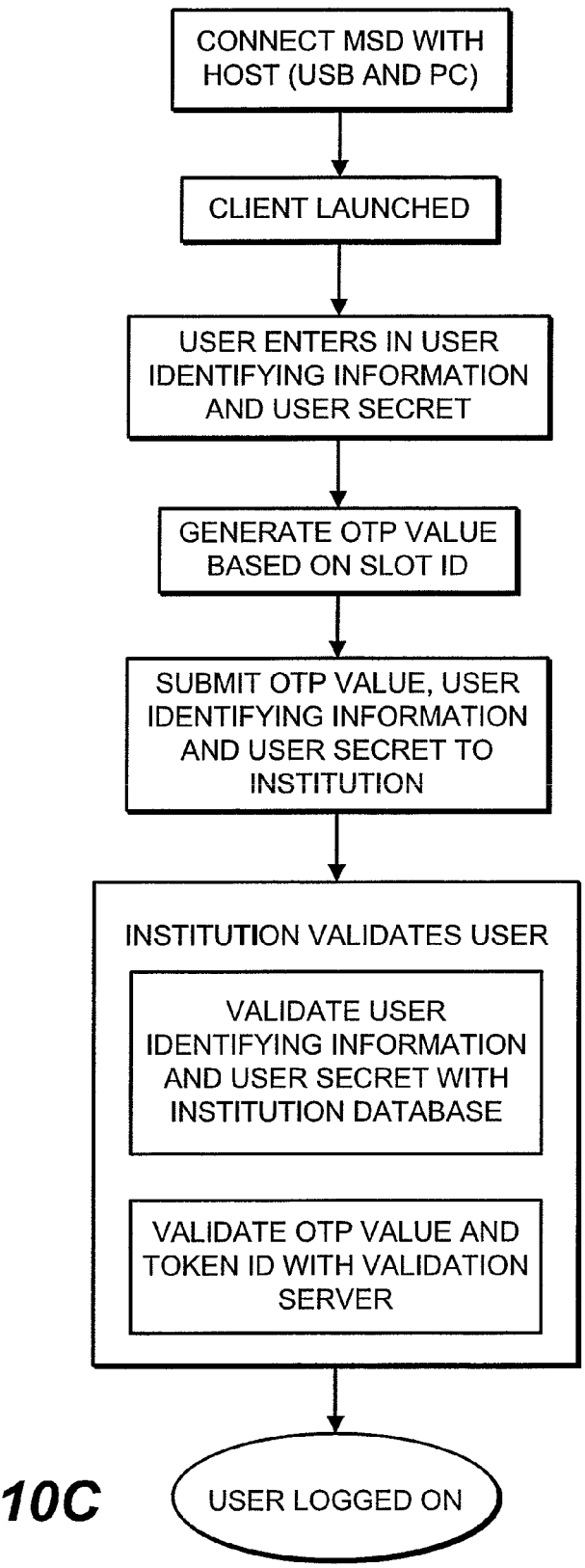
FIG. 10C is a flowchart of authentication as seen in step 915 of FIG. 9.

FIG. 10C illustrates the process of user and device authentication (step 915 of FIG. 9) in more detail. This is also shown in FIG. 5B. When the device gets activated it is bound and associated to an institution or account. This is done by using the device ID and slot information. The institution then needs to associate the device and its contents to the user name and password so that it can authenticate the user with device presented information plus the user specific information (user identifying information and secret). In step 960, the MSD is connected to the host if it is not already connected. Next in step 962, the client is launched if it is not open and running, and in step 964 the user enters in his identifying information (e.g. user name, account number etc.) and his secret (e.g. password or PIN). Next, in step 966 the OTP generator of MSD 100 generates an OTP value for a particular slot In step 968, the OTP value, user identifying information and user secret are submitted to the institution. Then, in step 970 the institution validates that the user for access to the institution. This involves steps 970A and 970B. In step 970A the institution validates the user identifying information and secret with the institutions database(s). It also, in step 970B, validates OTP value and token ID of MSD 100 with validation server 124. If then user has been successfully validated in step 970 he is then logged into the institution in step 974.

As mentioned, in one embodiment, the client may provide the user and authentication information to a web server that will upon receiving valid user credentials and authentication information, will automatically fill out the traditional log-in web page entries that are normally used to log on without the two-factor authentication. This embodiment would enable a given institution to maintain a single web log-on page, while adding a separate system component to handle the two factor authentication. In this case, the two-factor authentication may consist of forms of authentication that do not easily lend themselves to form-filling, as OTP does, but instead may be authentication schemes, such as PKI, which typically involve challenge-responses operations.

Figure 5C:
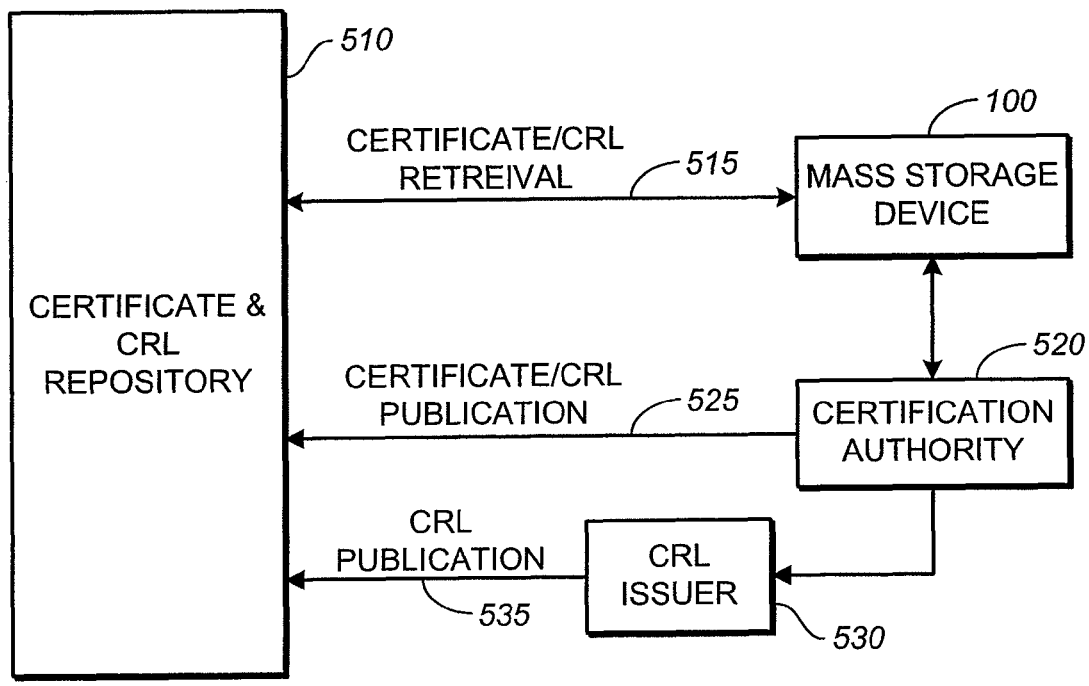
FIG. 5C is an illustration of the entities and interactions involved in authentication with a public key infrastructure.
Figure 6:
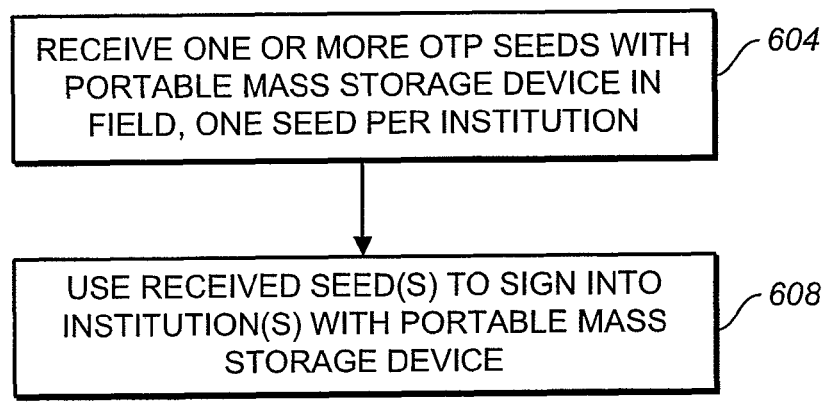
FIG. 6 is a flowchart of a method of use of mass storage device 100 to sign into institutions, according to an embodiment of the present invention.

FIG. 5C shows one possible implementation of the embodiment that utilizes the public key infrastructure for verification/authorization of credentials. Since transactions can be no more secure than the system in which they occur, the most important element becomes establishing a way for correspondents to locate each other and have confidence that the public key they use truly belongs to the person (or machine) with whom/which they wish to communicate. A Public Key Infrastructure is designed to provide this trust. Using a data element called a digital certificate or public key certificate, which binds a public key to identifying information about its owner, the infrastructure is designed to create the binding, and manage it for the benefit of all within the community of use.

PKI is an authentication technology. Using a combination of secret key and public key cryptography, PKI enables a number of other security services including data confidentiality, data integrity, and key management. The foundation or framework for PKI is defined in the ITU-T X.509 Recommendation [X.509] which is incorporated by this reference it is entirety.

End Entities are sometimes thought of as end-users. Although this is often the case, the term End Entity is meant to be much more generic. An End Entity can be an end-user, a device such as a router or a server, a process, or anything that can be identified in the subject name of a public key certificate. End Entities can also be thought of as consumers of the PKI-related services. In the present invention, as seen in the embodiment shown in FIG. 5, the end entity is the mass storage device 100 or its user.

Public keys are distributed in the form of public key certificates by CA 550. A certificate could be required from MSD 100 so that an institution 118 or validating entity would allow a user of MSD 100 to sign on. A certificate from an institution 118 could also be utilized to prove that the institution is authentic before the MSD would sign the user into the institution. Public key certificates are digitally signed by the issuing CA 520 (which effectively binds the subject name to the public key). CAs are also responsible for issuing certificate revocation lists ("CRLs") unless this has been delegated to a separate CRL Issuer. CAs may also be involved in a number of administrative tasks such as end-user registration, but these are often delegated to a separate registration authority ("RA") which is optional and not shown in FIG. 5C. In practice, CA 520 or another CA can also serve as the key backup and recovery facility although this function can also be delegated to a separate component. CAs are often thought of as the "source of trust" in a PKI. Typically, End Entities are configured with one or more "trust anchors" which are then used as the starting point to validate a given certification path. Once trust is established via the PKI interface, login can take place.

FIGS. 11A-I and 12A-B are interface screens of different embodiments of client 320. These screens serve to illustrate the convenience of the present invention. To a user, the login process becomes very simple, although relatively complex calculations and interactions are taking place "behind the scenes." For example, the user is unaware that the device is seeded for each institution selected, that the seed is used by a complex algorithm to generate a new (OTP) value for each login that is validated along with the user's other information automatically. The present invention combines a very high level of security with seamless automation in password management. This can also include a single sign on in certain embodiments, where the user's master information is automatically correlated with all the individual passwords and usernames for different institutions. There are a number of other methods of user identification that can be used with the present invention, such as biometrics, answering questions, etc. In one embodiment, the system may be employed to provide user information for more general two-factor authentication and/or password management operations, some of which information may be more sensitive than other information. The system may be designed to segregate such sensitive information and request user verification, additional entry of a PIN/password, or other action to ensure the user is aware of and authorizes such information to be provided by the system. One example of this may be for credit card authorization and payment.

Figure 11A:
FIGS. 11A-I are user interface screens of client 320 according to an embodiment of the present invention.
Figure 11B:
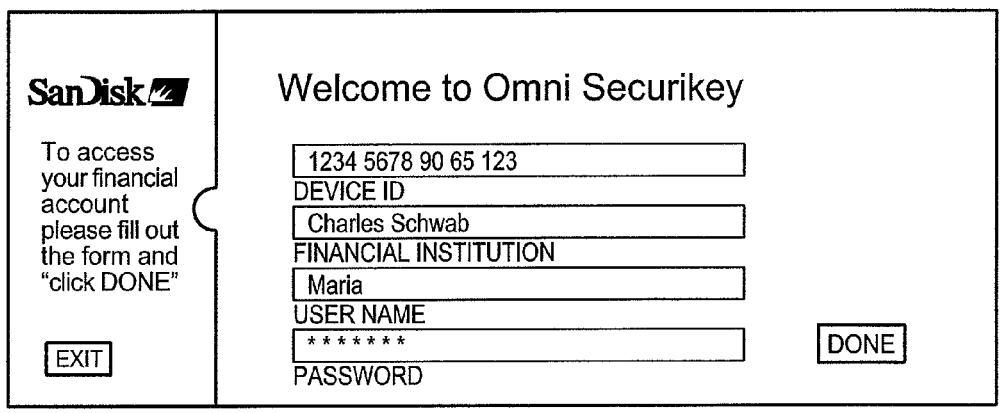
Figure 11C:
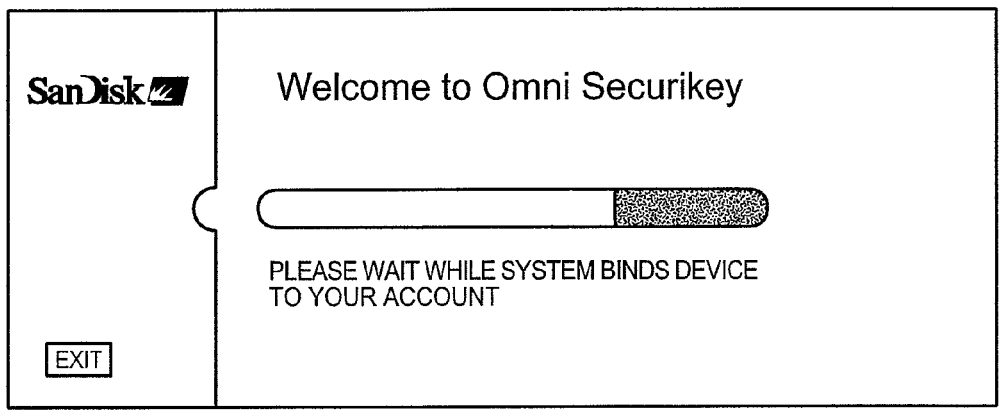
Figure 11D:
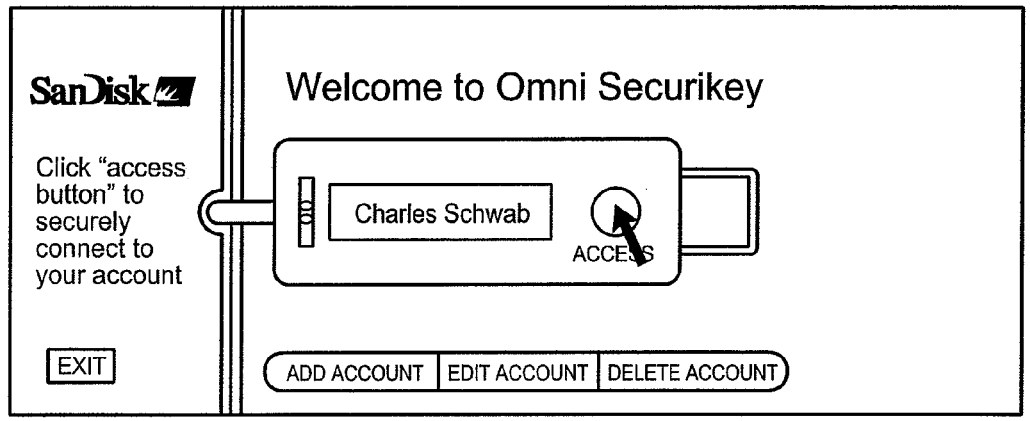
Figure 11E:
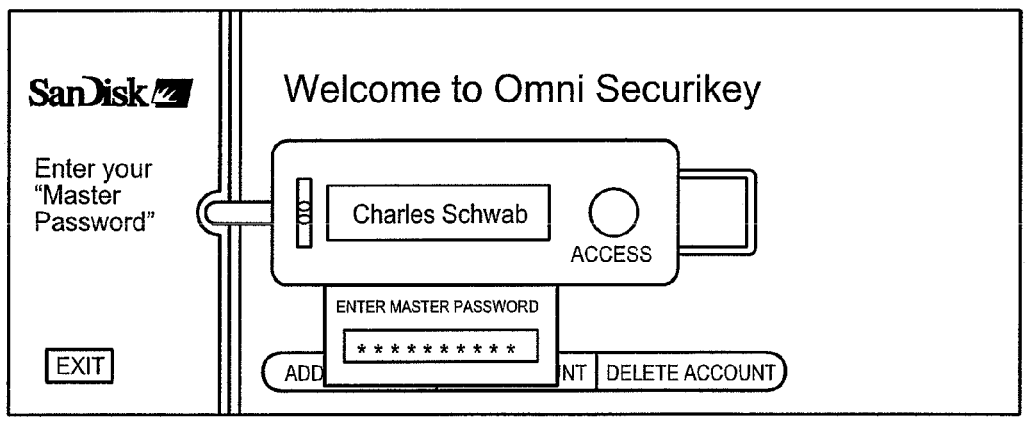
Figure 11F:
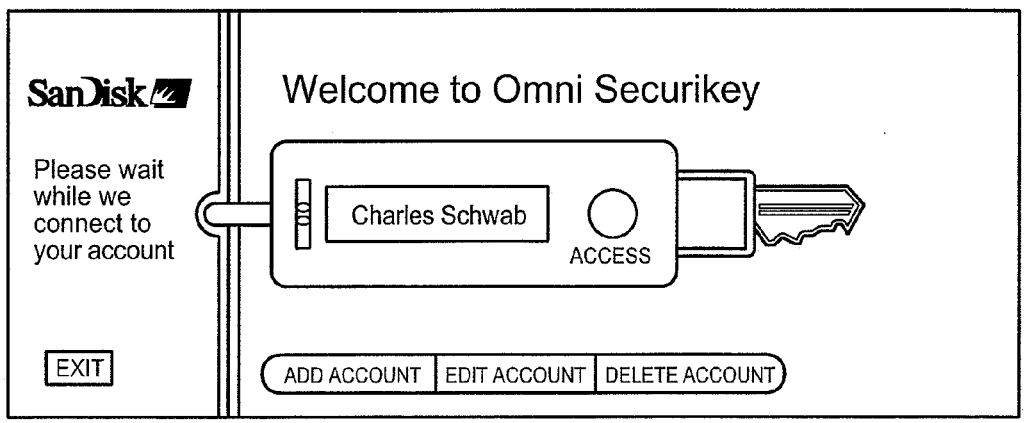
Figure 11G:
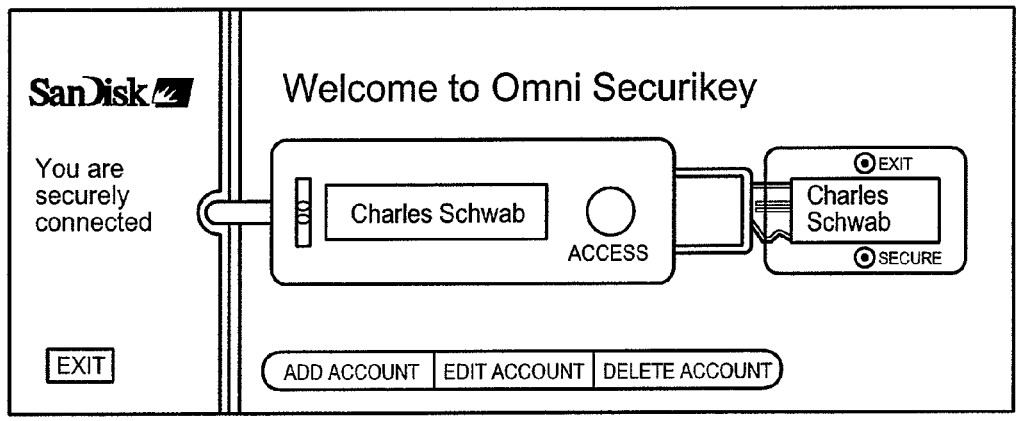
Figure 11H:
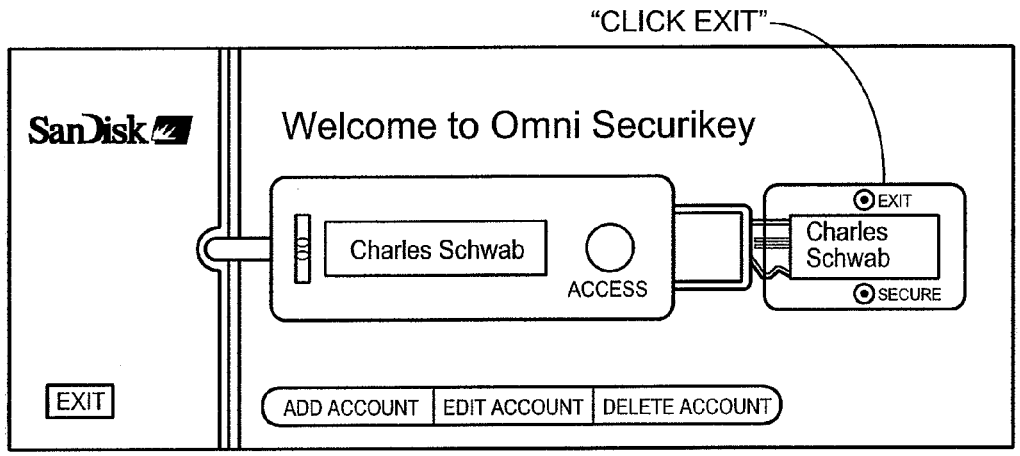
Figure 11I:
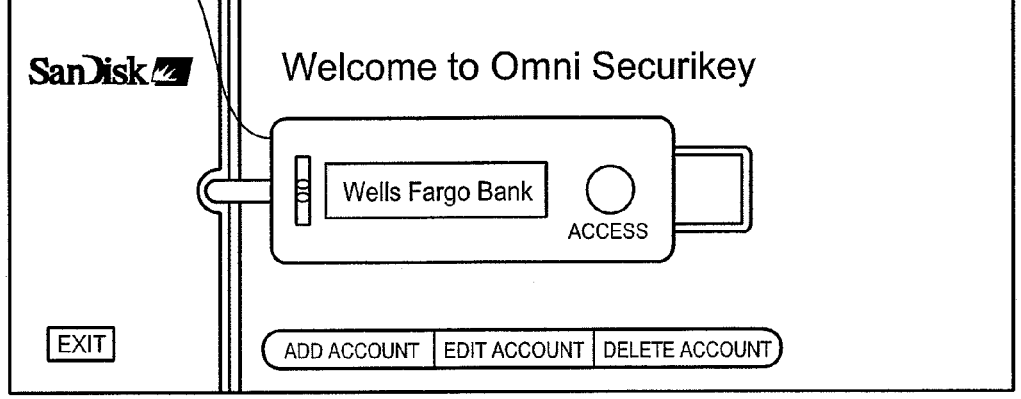

FIG. 11A shows a welcome screen, and FIG. 11B is an interface where the user can fill out his password and user name to access a particular institution. The user can enter a new institution or access an institution that has previously been configured. In this screen the user can enter the device ID of his MSD, although in the preferred embodiments the client will retrieve this information without the user having to enter it. In FIG. 11C a user interface informs the user that the system is binding the MSD to his account(s). In this case the selected institution is a financial institution or broker. As seen in FIG. 11D, the user can access multiple accounts he may have at a particular institution, and can add, edit, and delete accounts. In FIG. 11E, the user is asked to enter his master password. This is a password that is later correlated by the system with all the user's other passwords and account info. Once the user has been bound, in one embodiment, he need only enter this master password and in order to access his account the process will begin at FIG. 11D, rather than 11A or 11B. In FIG. 11F, the user is asked to wait as the system connects to his account. Next, the user is informed that he is securely connected to his account in FIG. 11G. At this stage, the web page or other interface of the institution will be opened on the host device of the user. When the user is finished accessing his account(s) he can then click the exit button of the user interface screen shown in FIG. 11H. The user can then connect to additional accounts, as seen in FIG. 11i.

Figure 12A:
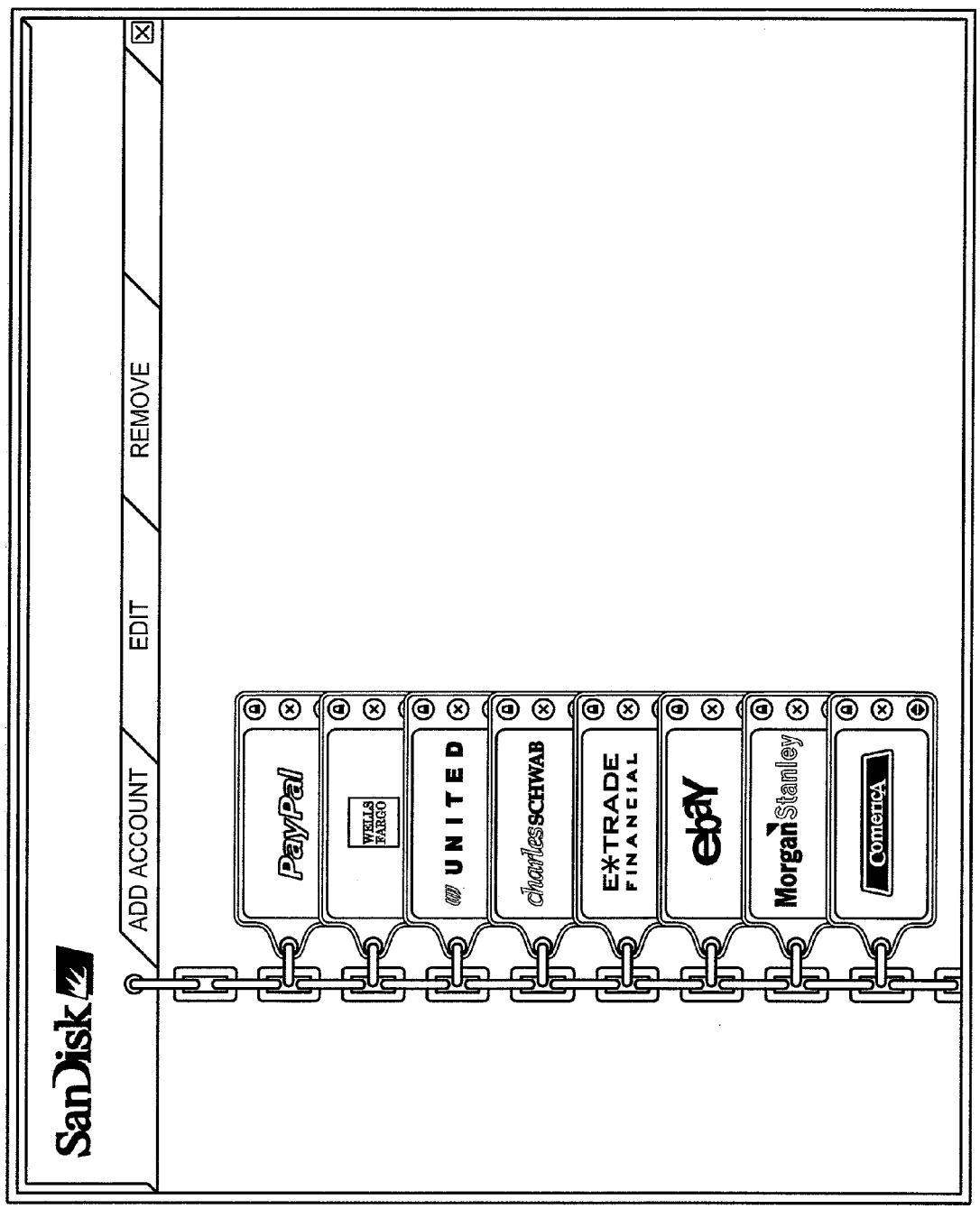
FIGS. 12A-B are user interface screens of client 320 according to an embodiment of the present invention.
Figure 12B:
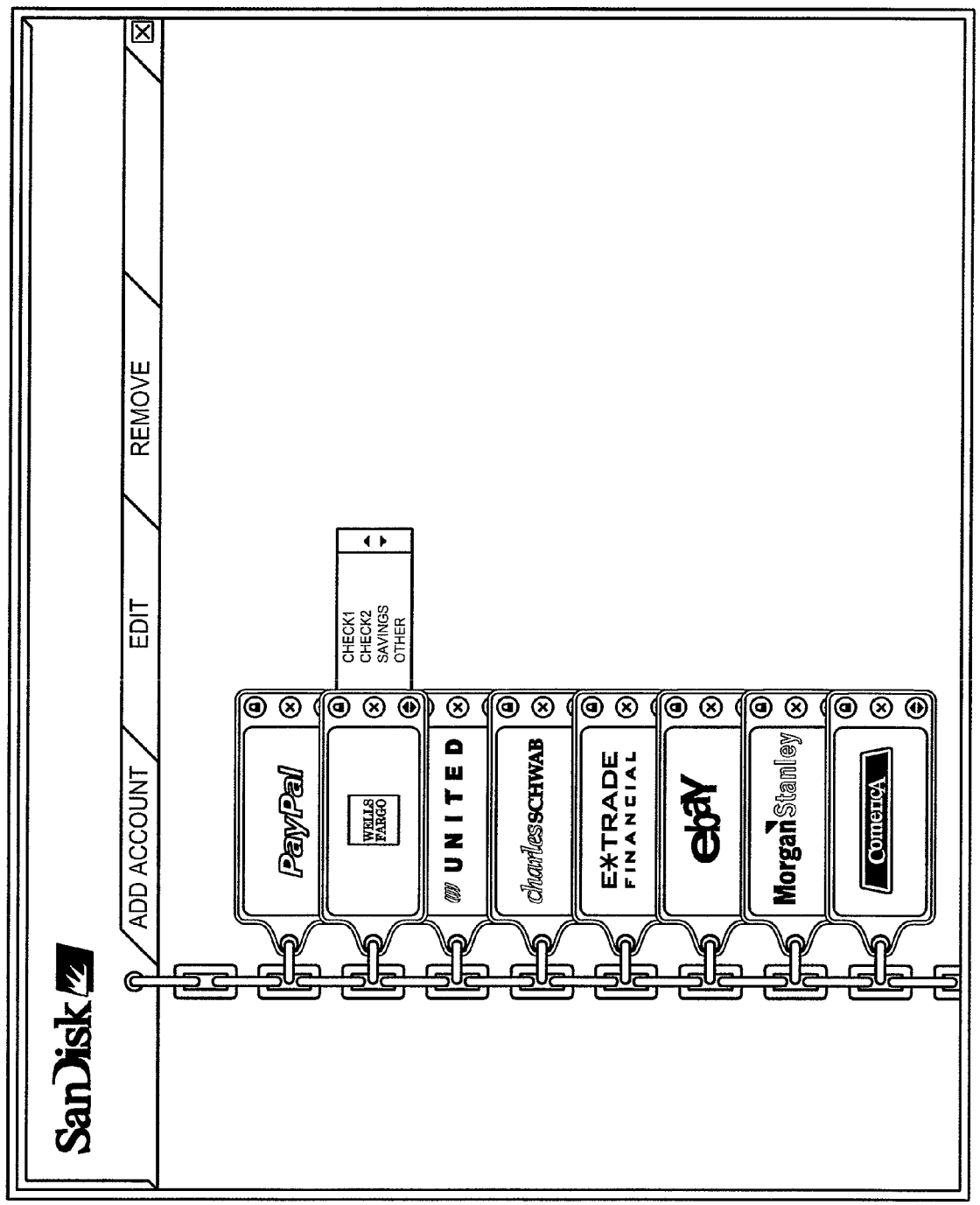

FIGS. 12A-B depict user interface screens of another embodiment of client 320. In FIG. 12A, icons representing a number of different institutions are simultaneously displayed on one user interface screen. The user can add an institution, also referred to as an "account," and edit or remove an account. The institutions can be manually added by the user, or alternatively the user could select from a list maintained by the MSD. Such a list would be updated remotely to the MSD from a server, either upon request by the user or automatically based on some schedule of update. The list could also be updated based upon based upon any number of events such as upon request for user enrollment. By clicking on buttons within each of the icons, the user can also access or log into the account and close or log off the account. As seen in FIG. 12B, when the user clicks on a particular account to open it, the client will allow the user to choose between his accounts at the particular institution, which can also be referred to as "sub-accounts."

In a preferred embodiment, once all the accounts shown have been configured, the user would only have to enter his master password for the MSD, and could then simply click on the icon corresponding to the institution he wishes to log into. In other embodiments, individual passwords and/or user ID's would also need to be entered for added security.

The operations described in detail earlier in the application that facilitate sign on would then take place seamlessly behind the scenes. This would simultaneously make dealing with logon and password management very convenient for the user, while at the same time providing for a very high level of security that would benefit users and institutions alike. All of this convenience and security are incorporated into a device a user most likely already owns. This is possible, because, unlike in dedicated tokens, the client can be added to the mass storage memory of a pocket sized mass storage device. The portable mass storage device has security, both physical and logical, that are more robust than in an open environment such as a PC, and hacking or "phishing" for information is therefore much more difficult. Also, unlike some mass storage devices that may correlate different passwords or other information, the present invention utilizes algorithms and processes that can generate unique password values that are constantly changing yet instantly verifiable.

While embodiments of the invention have been described, it should be understood that the present invention is not limited to these illustrative embodiments but is defined by the appended claims. For example, MSD 100 may utilize magnetic disk rather than flash type solid state memory for mass storage purposes, and any manner of symmetric or asymmetric authentication can be implemented for authentication purposes to enhance the traditional security of user selected passwords.

It is claimed:

1. A portable device capable of mass storage of user files and of user credential management, the portable device having a physical interface for removably coupling the device to a host device, and comprising:

mass storage solid state memory used to store user files and programs;

a micro controller that controls read and write operations of the mass storage solid state memory;

a one time password generator;

a client application residing in the mass storage solid state memory, the client application executable by a processor of the host to retrieve a one time password from the password generator of the device; and a first seed and counter pair, the first pair to authenticate the device to a first institution, wherein the portable device comprises a portable memory card or a portable USB drive, wherein the client application is launched, wherein the client application is executed by the processor of the host, and wherein the one time password generator is implemented within the portable device and generates the one time password within the portable device in response to the request.

2. A system for controlling access to data sites, the system comprising:

a mass storage device that can be removably coupled to a host computing device, wherein the mass storage device comprises a portable memory card or a portable USB drive;

a first electronic entity that loads a seed and a device identifier to the host computing device and mass storage device, while the mass storage device is coupled to the host computing device;

a one time password generator implemented within the portable mass storage device;

a client application; and a second electronic entity with which the mass storage device passes a user identifier of a user of the mass storage device, the device identifier, and a one time password value, wherein the client application is launched, wherein the client application is executed by a processor of the host computing device, wherein the client application sends a request to the mass storage device, and wherein the one time password value is generated within the portable device by the one time password generator in response to the request.

3. The system of claim 2, further comprising a third electronic entity, and wherein the second electronic entity passes the user identifier and one time password value to the third electronic entity for verification of the user and mass storage device.

4. The system of claim 3, wherein the third electronic entity provides an indicator of whether verification was successful or unsuccessful.

5. The system of claim 2, wherein said first electronic entity is operable to establish a secure channel with the mass storage device and to load the seed and identifier over the secure channel.

6. The system of claim 2, further comprising an additional mass storage device, the system operable to transfer authentication rights from one mass storage device to another mass storage device.

7. The system of claim 6, wherein the authentication rights comprise the device identifier and the seed.

8. The system of claim 7, wherein transferring the authentication rights comprises transferring the seed and the device identifier.

9. The system of claim 8, wherein the first electronic entity transfers the authentication rights to the additional mass storage device.

10. The system of claim 9, wherein the system establishes a secure channel with the additional mass storage device and the transfer is completed over the secure channel.

11. The system of claim 6, wherein the system is further operable to remove the authentication rights from the device where the rights are transferred from.

12. The system of claim 11, wherein the authentication rights are removed upon successful verification of the user of the mass storage device where the rights are transferred from.

13. The system of claim 11, wherein the system is further operable to remove the device that had the authentication rights removed from a list of inactive devices.

14. The system of claim 2, wherein upon loss of the mass storage device by the user of the device the system is operable to invalidate the seed and identifier of the device at one or more of the electronic entities.

15. The system of claim 14, wherein upon loss of the mass storage device the identifier and seed of the lost device is transferred to a new device of the user.

16. The system of claim 14, wherein upon loss of the mass storage device a new identifier and seed are transferred to a new device of the user.

17. A portable device capable of mass storage of user files and of user credential management, the portable device having a physical interface for removably coupling the device to a host device, and comprising:
   mass storage solid state memory used to store user files and programs;
   a micro controller that controls read and write operations of the mass storage solid state memory;
   a one time password generator;
   an application residing in the mass storage solid state memory, the application executable by a processor of the host to retrieve a one time password from the password generator of the device; and
   a first seed and counter pair,
   the first pair to authenticate the device to a first institution, wherein the portable device comprises a portable memory card or a portable USB drive and wherein the one time password generator is implemented within the portable device and generates the one time password within the portable device, wherein the application is configured to present to the user plural institutions for the user to access and wherein the one time password generator is configured to generate one time passwords for each of the institutions.

18. A system for controlling access to data sites, the system comprising:
   a mass storage device that can be removably coupled to a host computing device, wherein the mass storage device comprises a portable memory card or a portable USB drive;
   a first electronic entity that loads a seed and a device identifier to the host computing device and mass storage device, while the mass storage device is coupled to the host computing device;
   a one time password generator implemented within the portable mass storage device; and
   a second electronic entity with which the mass storage device passes a user identifier of a user of the mass storage device, the device identifier, and a one time password value, wherein the one time password value is generated within the portable device by the one time password generator, wherein the mass storage device includes an application launched from the mass storage device, executable by the host computing device, and configured to present to the user plural institutions for the user to access and wherein the one time password generator is configured to generate one time password values for each of the institutions.

* * * * *